US012662413B2

(12) United States Patent
Goodno et al.

(10) Patent No.: US 12,662,413 B2
(45) Date of Patent: *Jun. 23, 2026

(54) SYSTEM FOR FABRICATING AN OPTICAL ELEMENT

(71) Applicant: NORTHROP GRUMMAN SYSTEMS CORPORATION, Falls Church, VA (US)

(72) Inventors: Gregory D. Goodno, Los Angeles, CA (US); Joshua E. Rothenberg, Los Angeles, CA (US); James G. Ho, Los Angeles, CA (US); Dustin Guenther, La Mirada, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 26 days.

This patent is subject to a terminal disclaimer.

(21) Appl. No.: 18/500,196

(22) Filed: Nov. 2, 2023

(65) Prior Publication Data

US 2024/0059600 A1       Feb. 22, 2024

Related U.S. Application Data

(63) Continuation of application No. 17/809,674, filed on Jun. 29, 2022, now Pat. No. 11,932,567, which is a
(Continued)

(51) Int. Cl.
| | |
|---|---|
| *C03B 37/15* | (2006.01) |
| *G02B 27/09* | (2006.01) |
| *G02B 27/62* | (2006.01) |

(52) U.S. Cl.
CPC .......... *C03B 37/15* (2013.01); *G02B 27/0927* (2013.01); *G02B 27/62* (2013.01)

(58) Field of Classification Search
CPC ...... G02B 27/0927; G02B 27/62; C03B 37/15
See application file for complete search history.

(56) References Cited

U.S. PATENT DOCUMENTS

| | | | |
|---|---|---|---|
| 6,266,460 | B1 | 7/2001 | Doerr |
| 7,187,492 | B1 | 3/2007 | Shay |
(Continued)

FOREIGN PATENT DOCUMENTS

| | | |
|---|---|---|
| CN | 1393689 A | 1/2003 |
| CN | 101025379 A | 8/2007 |
(Continued)

OTHER PUBLICATIONS

Fred M. Dickey and Scott C. Holswade. Gaussian laser beam profile shaping. Optical Engineering, vol. 35 No. 11 pp. 3285-3295 (Nov. 1996). Copyrighted 1996 Society of Photo-Optical Instrumentation Engineers.
(Continued)

*Primary Examiner* — Thomas A Hollweg
*Assistant Examiner* — Mary A El-Shammaa
(74) *Attorney, Agent, or Firm* — Shumaker, Loop & Kendrick LLP; John A. Miller

(57) ABSTRACT

A system for fabricating an optical element. The system includes means for welding an array of fibers to the optical element, means for measuring an angle error and a position error of each fiber, means for calculating a correction for each fiber for the angle error and the position error and means for correcting the angle and position of each fiber using the calculated corrections.

11 Claims, 18 Drawing Sheets

Related U.S. Application Data continuation of application No. 16/592,321, filed on Oct. 3, 2019, now Pat. No. 11,407,672.

(56) References Cited

U.S. PATENT DOCUMENTS

| | | | |
|---|---|---|---|
| 7,199,924 | B1 | 4/2007 | Brown et al. |
| 7,283,702 | B2 | 10/2007 | Brosnan et al. |
| 7,339,170 | B2 | 3/2008 | Deliwala |
| 7,436,588 | B2 | 10/2008 | Rothenberg et al. |
| 9,417,366 | B2 | 8/2016 | Rothenberg |
| 9,735,537 | B1 | 8/2017 | Rothenberg et al. |
| 10,267,992 | B1 | 4/2019 | Goodno et al. |
| 10,620,446 | B1 | 4/2020 | Ho et al. |
| 11,473,981 | B2 | 10/2022 | Roth, II et al. |
| 2002/0012506 | A1 | 1/2002 | Iizuka et al. |
| 2006/0093263 | A1 | 5/2006 | Akashi et al. |
| 2007/0217740 | A1 | 9/2007 | Brosnan et al. |
| 2009/0296751 | A1 | 12/2009 | Kewitsch et al. |
| 2015/0036218 | A1 | 2/2015 | Rothenberg |
| 2015/0108337 | A1 | 4/2015 | Goodwin |
| 2015/0234195 | A1 | 8/2015 | Honea et al. |
| 2019/0356394 | A1 | 11/2019 | Bunandar et al. |

FOREIGN PATENT DOCUMENTS

| | | |
|---|---|---|
| CN | 206498088 U | 9/2017 |
| CN | 110319828 A | 10/2019 |
| CN | 112236698 A | 1/2021 |
| WO | 0043730 A1 | 7/2000 |
| WO | 200906761 A1 | 1/2009 |
| WO | 2010046661 A1 | 4/2010 |

OTHER PUBLICATIONS

Alexander Laskin, Vadim Laskin, and Aleksei Ostrun. Refractive beam shapers for optical systems of lasers. aDLopTICA GmbH, Rudower Chaussee 29, 12489 Berlin, Germany; St. Petersburg National Research University of Information Technologies, Mechanics and optics, Kronverkskiy pr., 49, 197101, St. Petersburg, Russia. 1-10 pages.

David L. Shealy and John A. Hoffnagle. Review: design and analysis of plano-aspheric laser beam shapers. Laser Beam Shaping XIII, edited by Andrew Forbes, Todd E. Kizotte, Proc. of SPIE vol. 8490, 849003. 1-13 pages. Copyrighted 2012 SPIE. CCC code: 0277-786/12/$18 doi: 10.1117/12.945872.

John A. Hoffnagle and C. Michael Jefferson. Design and performance of a refractive optical system that converts a Gaussian to a flattop beam. Copyrighted 2000 Optical Society of America. Applied Optics/vol. 39, No. 30/Oct. 20, 2000. pp. 5488-5499.

Mikhail A. Vorontsov, Thomas Weyrauch, Leonid A. Beresnev, Gary W. Carhart, Ling Liu, and Konley Aschenbach. Adaptive Array of Phase-Locked Fiber Collimators: Analysis and Experimental Demonstration. IEEE Journal of Selected Topics in Quantum Electronics, vol. 15, No. 2, Mar./Apr. 2009. Copyright 2009 IEEE. pp. 269-280.

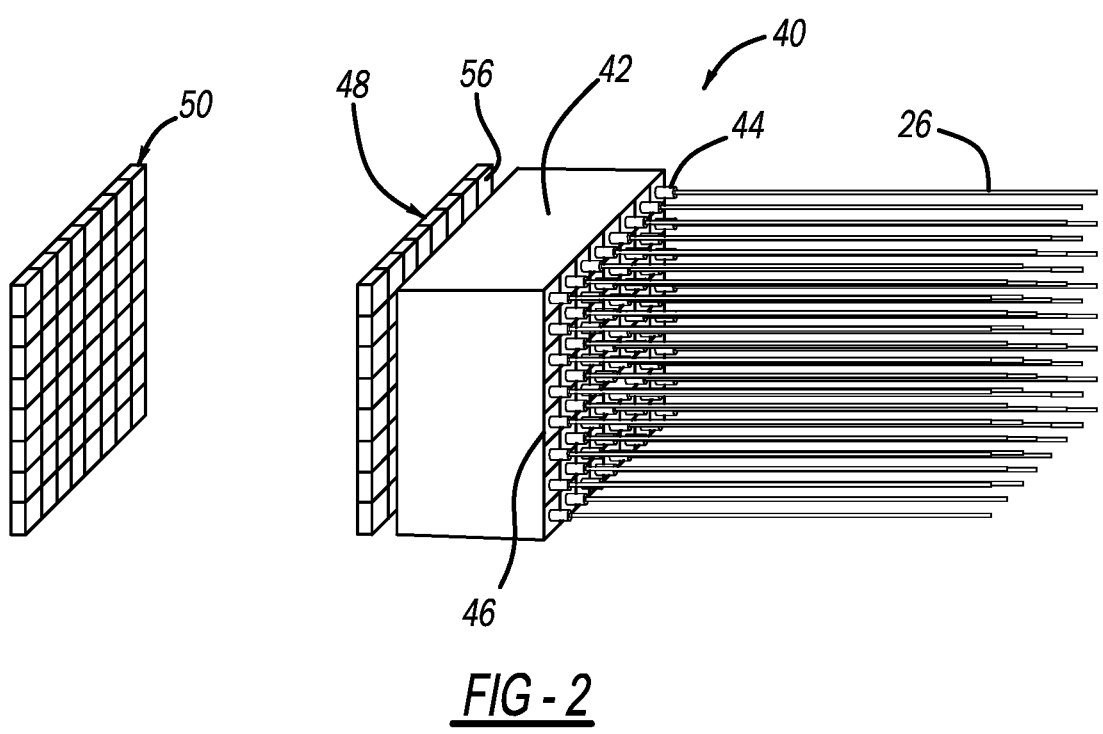
_FIG - 2_
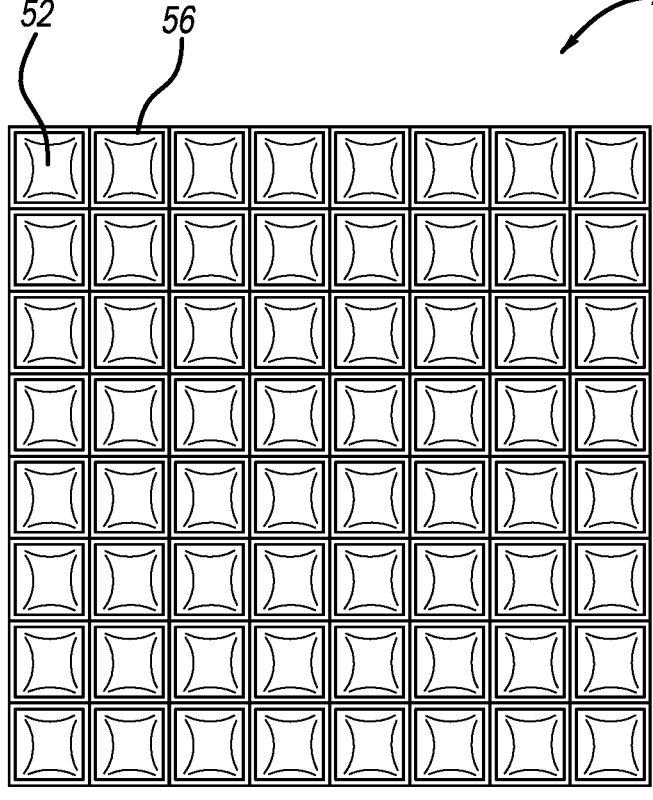
_FIG - 3_

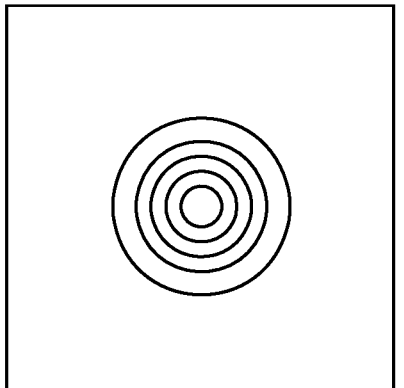
*FIG - 4A*
*FIG - 4B*
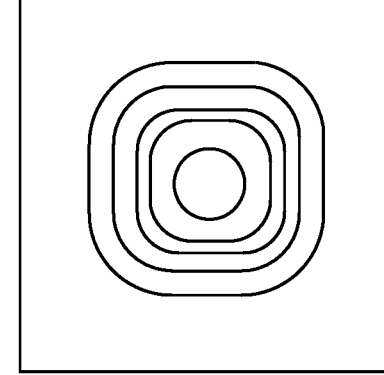
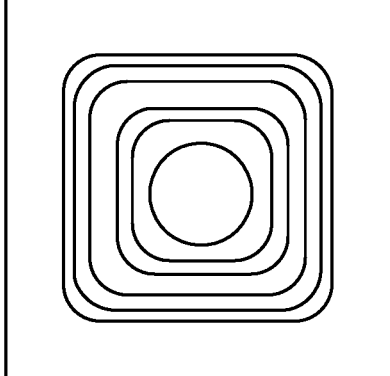
*FIG - 4C*
*FIG - 4D*
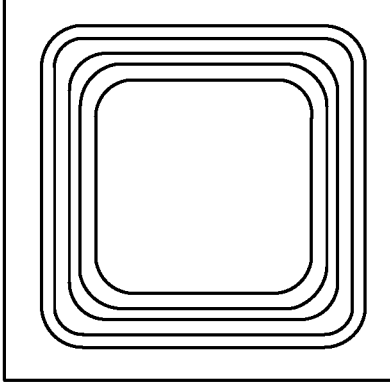

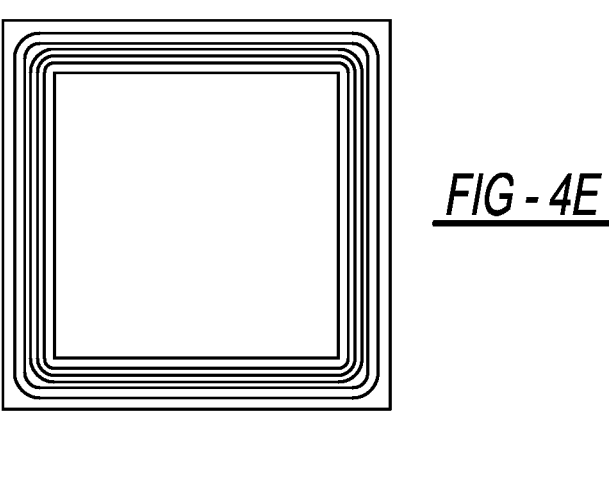
*FIG - 4E*
*FIG - 4F*
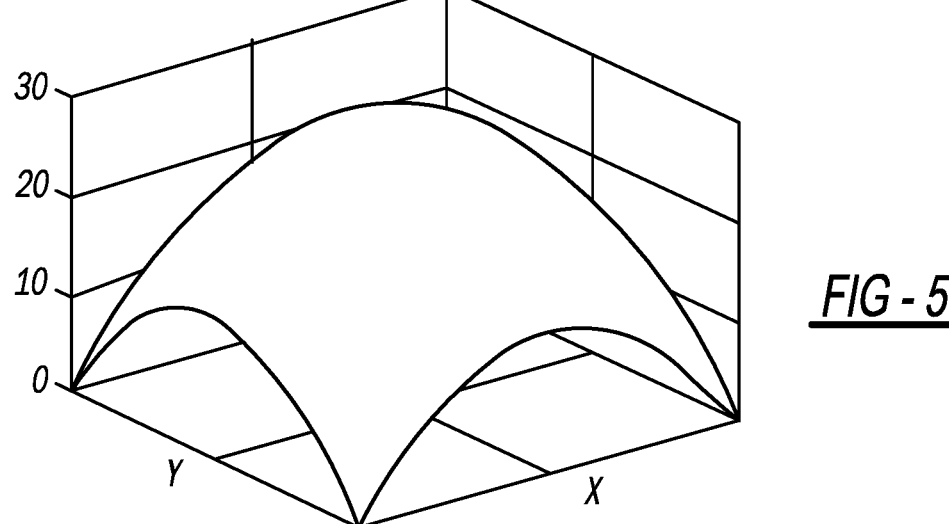
*FIG - 5*

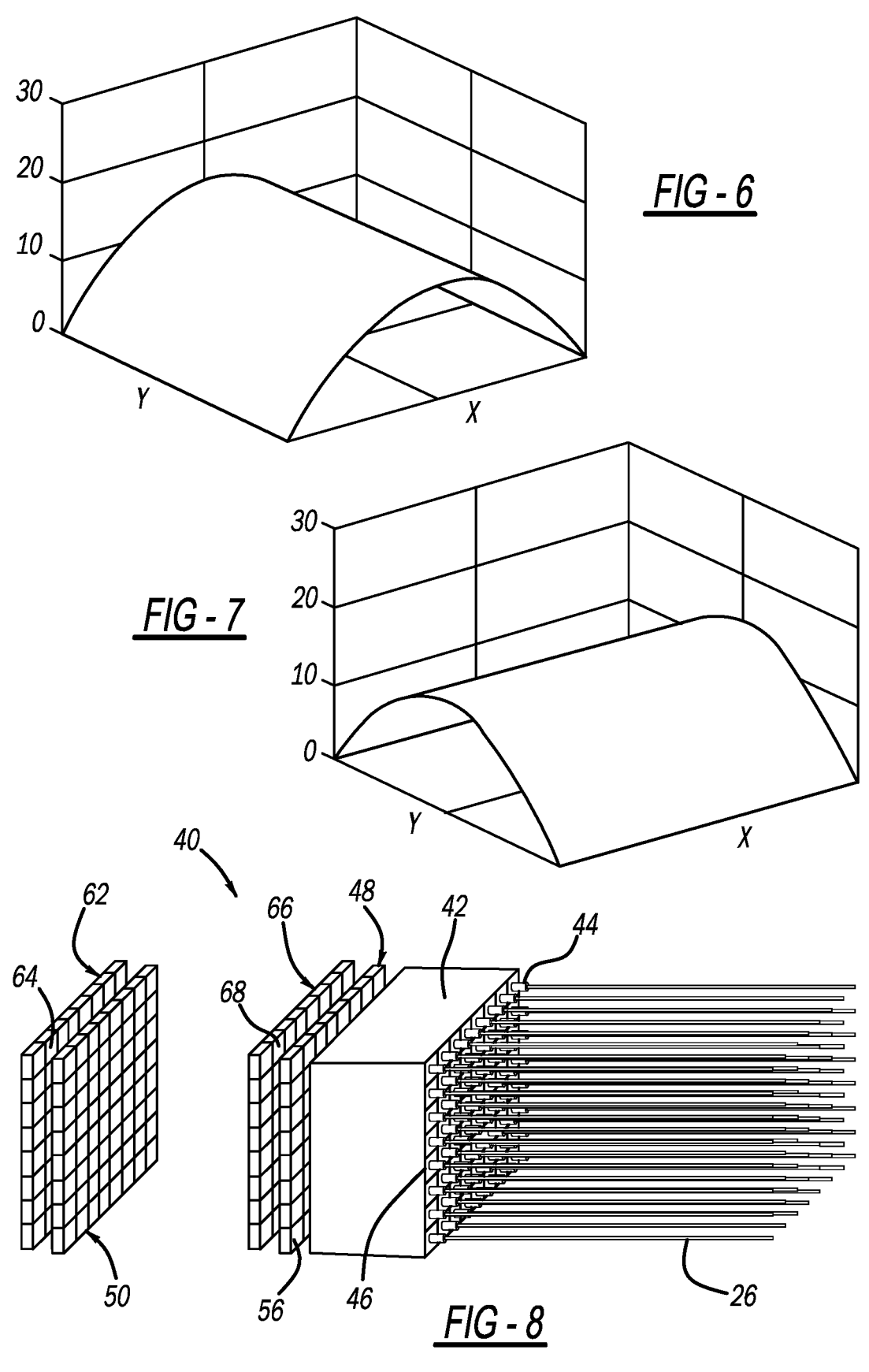
_FIG - 6_
_FIG - 7_
_FIG - 8_

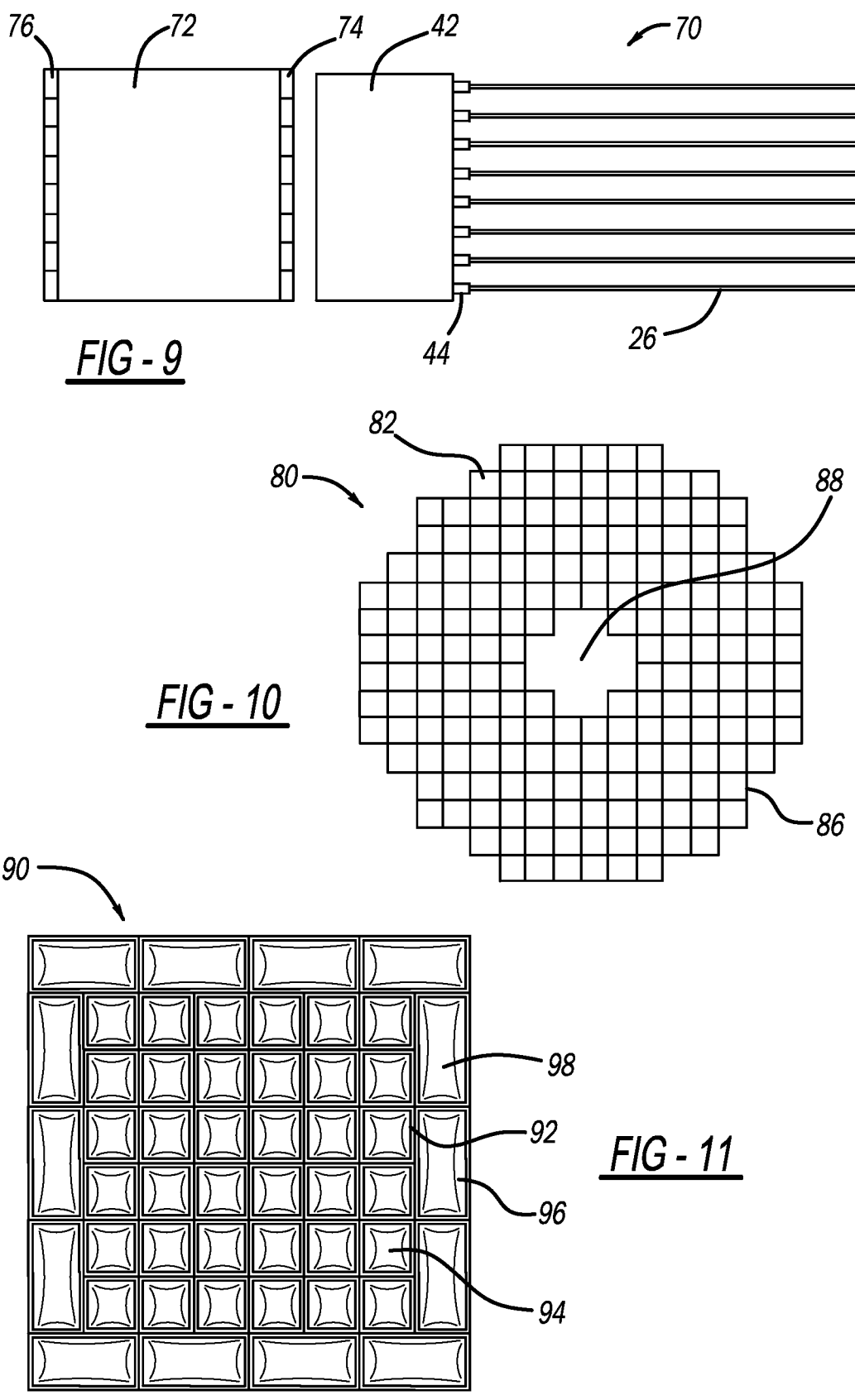
_FIG - 9_
_FIG - 10_
_FIG - 11_

*232*

230

Fab of low-precision beamshaper
array containing manufacturing errors

234

Metrology of errors

236

Calculation of trim prescription to fix errors

238

Application of trim prescription

240

Successful generation of high fill factor array
of beams with low error

*264*        *282*    *284*        276

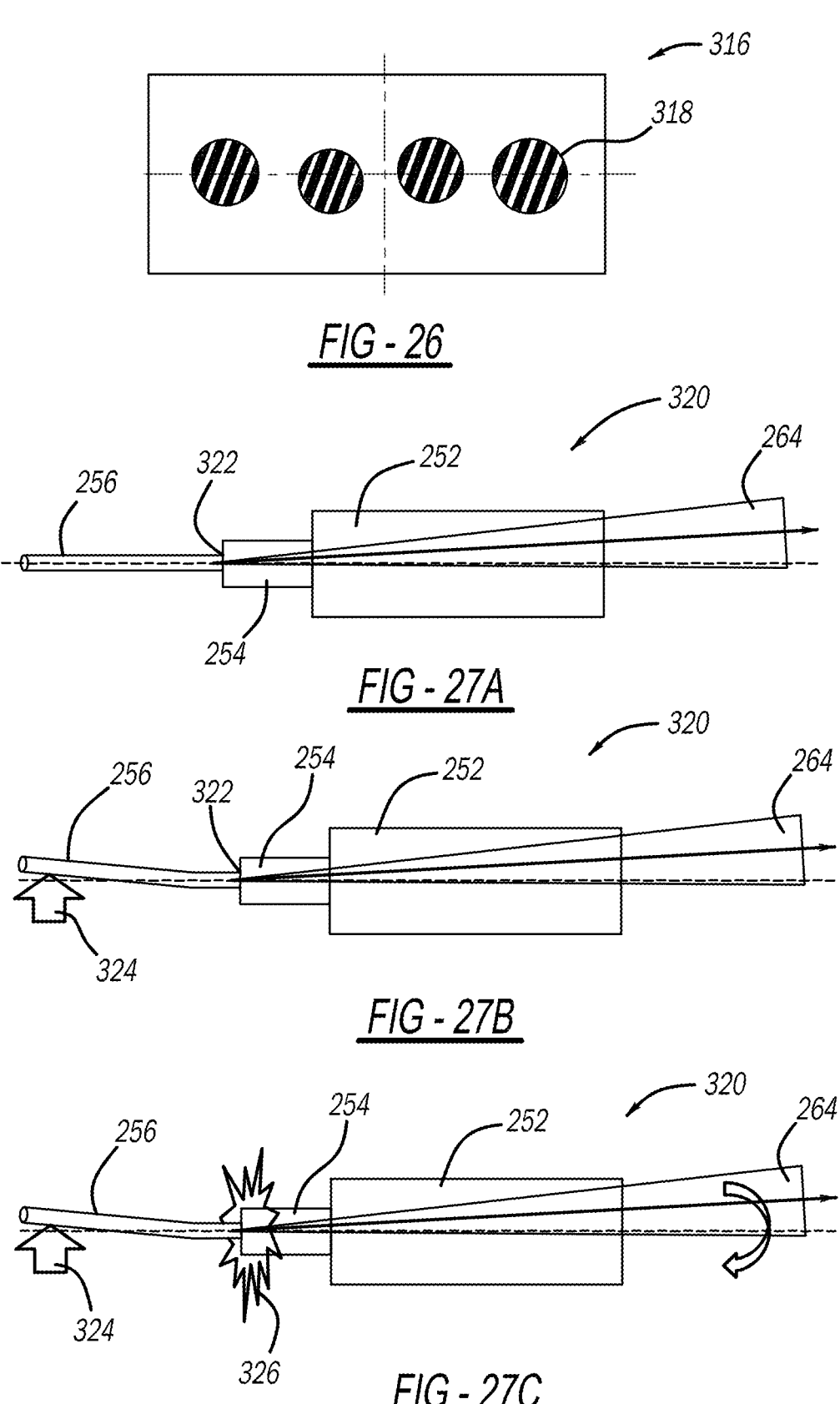
_FIG - 26_
_FIG - 27A_
_FIG - 27B_
_FIG - 27C_

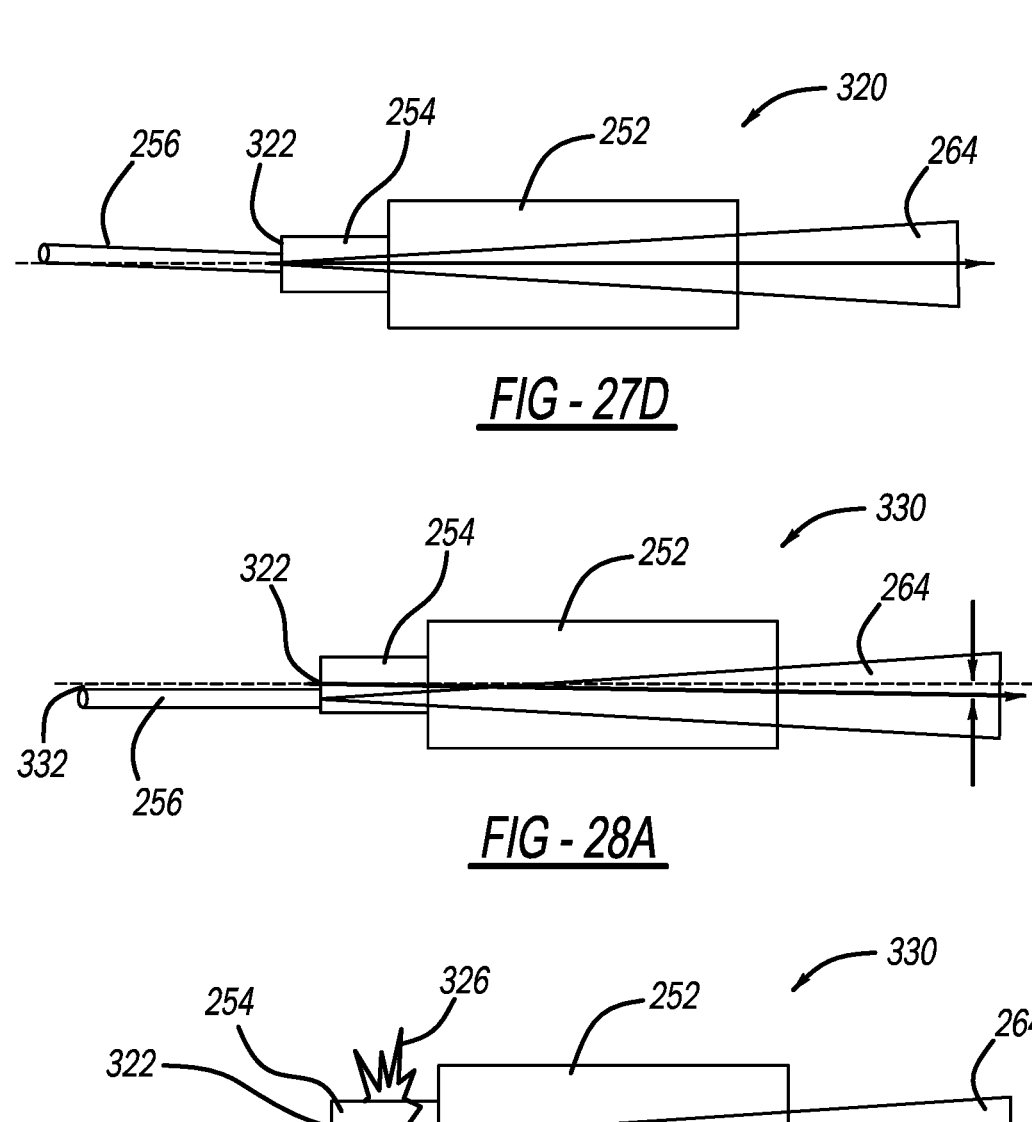
*FIG - 27D*
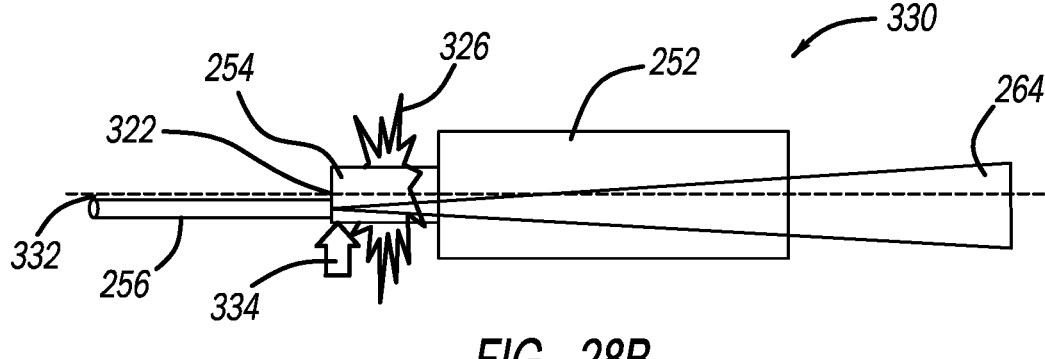
*FIG - 28A*
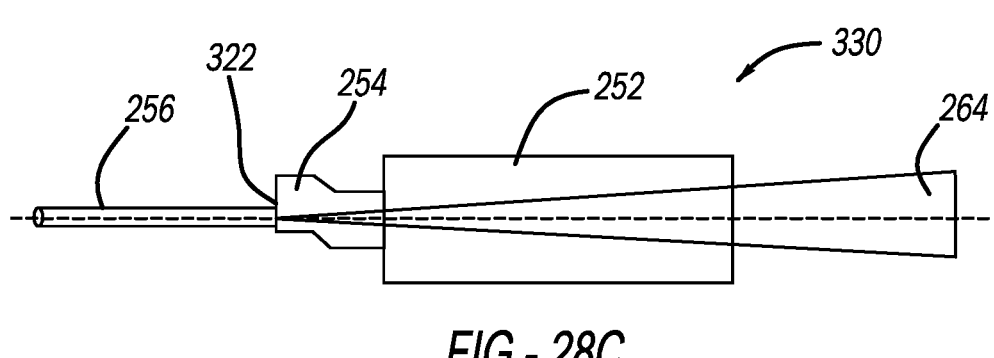
*FIG - 28B*
*FIG - 28C*

1

SYSTEM FOR FABRICATING AN OPTICAL ELEMENT

CROSS REFERENCE TO RELATED APPLICATIONS

This application is a continuation application of U.S. application Ser. No. 17/809,674, titled, SYSTEM AND METHOD FOR FABRICATING AN OPTICAL ELEMENT, filed Jun. 29, 2022, which was a continuation application of U.S. application Ser. No. 16/592,321, titled, METHOD FOR HIGH FILL-FACTOR OPTICAL ARRAYS MANUFACTURING, filed Oct. 3, 2019, now U.S. Pat. No. 11,407,672.

BACKGROUND

Field

This disclosure relates generally to a system for fabricating an optical element and, more particularly, to a system for fabricating an optical element, where the system includes means for welding an array of fibers to the optical element, means for measuring an angle error and a position error of each fiber, means for calculating a correction for each fiber for the angle error and the position error and means for correcting the angle and position of each fiber using the calculated corrections.

Discussion

High power laser amplifiers have many applications, including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam that amplifies the seed beam and generates the high power laser beam, where the fiber has an active core diameter of about 10-20 µm or larger. Fiber laser amplifiers are useful as energy sources for directed energy weapons because of their high efficiency, high power scalability and excellent beam quality.

Improvements in fiber laser amplifier designs have increased the output power of the fiber amplifier to approach its practical power and beam quality limit. To further increase the output power some fiber laser systems employ multiple fiber laser amplifiers that combine the amplified beams in some fashion to generate higher powers. A design challenge for fiber laser amplifier systems of this type, especially those employed in directed energy weapons that direct a high energy beam on a target, is to combine the beams from a plurality of fiber amplifiers in a manner so that the beams provide a single beam output having a uniform phase over the beam diameter such that the beam can be focused to a small focal spot. Focusing the combined beam to a small spot at a long distance (far-field) defines the quality of the beam.

There are two approaches to scaling beam combiner laser weapons systems to higher powers. One approach is known as spectral beam combining (SBC), where multiple lasers of different wavelengths are combined on a diffraction grating or other dispersive optic into a single beam. The other approach is known as coherent beam combining (CBC), where multiple mutually coherent lasers are locked in phase with one another and combined into a single beam either by overlapping in the near field using a beam splitter, or by tiling side by side to form a composite beam, a configuration that is colloquially referred to as a "phased array".

Of the different beam combining approaches, the phased array approach is unique in that it provides added utility beyond simply higher power with good beam quality. By changing the relative phases ("piston") between the side-by-side laser tiles, a composite wavefront across the tiled beam can be synthesized. This synthesized wavefront can provide either high speed beam steering by applying a linear phase ramp across the array elements, or more generally can compensate any downstream wavefront aberration by imposing the conjugate wavefront on the composite tiled beam. This can enable aim-point maintenance on a high speed moving target despite high platform jitter, and can also enable the formation of a near diffraction limited spot on a distant target despite large intervening atmospheric turbulence and aero-optic aberrations. In this regard, the capability is essentially similar to that of a beam control system using a traditional deformable mirror (DM), but without the need for DM hardware and with orders of magnitude faster actuation capability. DMs are typically limited in their actuation speed to acoustic-class (multi-kHz) speeds due to the need to physically deform a mirror surface, while phased array pistons can be actuated at GHz-class speeds using commercially fiber-coupled waveguide electro-optic modulators. These high speeds can be desirable for active compensation of rapidly varying wavefront disturbances, particularly those arising from aero-optic effects on moving air platforms.

It is desirable in these types of fiber array amplifiers to provide an array of fiber beams having a high spatial fill factor, which for flat-top beams is defined as the fraction of the combined beam area occupied by the high power beams. For the case of beams with non-flat-top profiles, the fill factor can be more generally defined as $1-\sigma p2/(4P2)$, where P is the average laser intensity and $\sigma p2$ is the variance of the laser intensity across the combined beam area. The fiber beam emitters in these systems emit a beam typically having a round near-Gaussian profile, although other non-Gaussian profiles are possible, and the beams are arranged in an array next to each other. The fiber beams are then collimated by collimating optics, where spaces between the beams cause optical power to be generated in spatial sidelobes that are likely to be off-target in the far-field. Therefore, it is desirable to fill the entire aperture of the telescope that projects the combined beam on the target by increasing the fill factor to obtain the smallest possible spot in the far-field. The known fiber amplifier systems typically employ lenses that collimate the round Gaussian beams to increase the fill factor. However, high fill factor beam arrays whose elements have near-Gaussian profiles exhibit high clipping losses since the wings of the beams are blocked by neighboring elements. Thus, there is a need for beam shaper arrays with higher fill factors and lower clipping losses than is possible using simple lenses and near-Gaussian beams.

BRIEF DESCRIPTION OF THE DRAWINGS

FIG. 2 is an isometric type view of the beam shaper array assembly separated from the fiber laser amplifier system shown in FIG. 1;

FIG. 3 is a front view of a beam shaper array in the beam shaper array assembly shown in FIG. 2;

FIGS. 4A-4F are beam profiles for one of the fiber beams propagating through the beam shaper array assembly shown in FIG. 2 showing how the beam profile evolves and expands as it propagates from one beam shaper array to the other beam shaper array to go from a round Gaussian profile to a square flat-top profile;

FIG. 5 is an illustration of one of the beam shapers in the beam shaper array shown in FIG. 3 that is shaped in both the X and Y directions;

FIG. 6 is an illustration of one of the beam shapers in the beam shaper array shown in FIG. 3 shaped in the X direction;

FIG. 7 is an illustration of one of the beam shapers in the beam shaper array shown in FIG. 3 shaped in the Y direction;

FIG. 8 is an isometric type view of the beam shaper array assembly shown in FIG. 2 and including trim beam shaper arrays;

FIG. 9 is an isometric type view of a beam shaper array assembly of the type shown in FIG. 2 and including beam shaper arrays on opposing sides of a block;

FIG. 10 is a front view of a beam shaper array having a number of separate square beam cells where the cells have been tiled so that an outer edge of the beam shaper array more closely matches a round aperture;

FIG. 11 is a front view of a beam shaper array having beam cells of different shapes;

FIG. 26 is a front view of an image at the interferometer in FIG. 25;

FIGS. 27A-27D are side views of an emitter array showing a process for correcting an angle of a fiber in the array;

FIGS. 28A-28C are side views of an emitter array showing a process for correcting a position of a fiber in the array;

DETAILED DESCRIPTION OF THE EMBODIMENTS

The following discussion of the embodiments of the disclosure directed to a system for fabricating an optical element, where the system includes means for welding an array of fibers to the optical element, means for measuring an angle error and a position error of each fiber, means for calculating a correction for each fiber for the angle error and the position error and means for correcting the angle and position of each fiber using the calculated corrections, is merely exemplary in nature, and is in no way intended to limit the disclosure or its applications or uses. For example, the fabricated optical element has particular application as an emitter in a CBC or an SBC fiber laser amplifier system. However, as will be appreciated by those skilled in the art, the optical element may have application for other optical systems.

Figure 1:
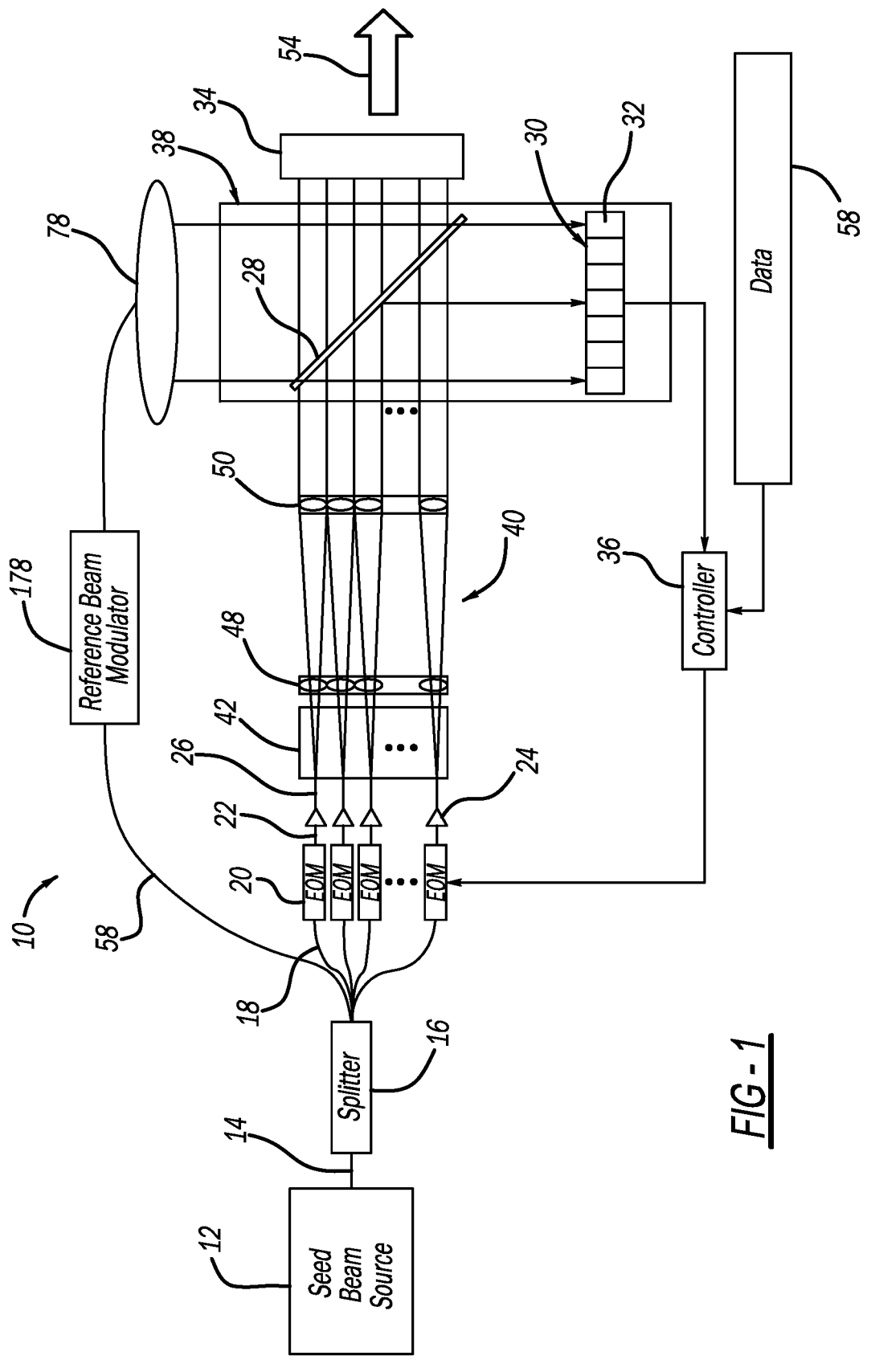
FIG. 1 is a schematic block diagram of a CBC fiber laser amplifier system that includes a beam shaper array assembly.

FIG. 1 is a schematic block diagram of a CBC fiber laser amplifier system 10 that includes a seed beam source 12 that generates a continuous wave frequency-modulated seed beam having a center wavelength A. on a fiber 14. The source 12 may include a master oscillator (MO), such as a single-longitudinal mode distributed feedback (DFB) diode laser oscillator, and a frequency modulator, such as an electro-optical modulator (EOM). The EOM may receive an applied voltage provided by an amplified radio frequency (RF) electrical drive signal from an RF source (not shown) that provides frequency modulation broadening, such as white noise or pseudo-random bit sequence (PRBS), so that the modulated seed beam has a linewidth that is substantially broadened, which suppresses stimulated Brillouin scattering in a downstream high power fiber amplifier. The modulated seed beam on the fiber 14 is split by an optical splitter 16 to produce a plurality of split seed beams on fibers 18 having the same wavelength A, where each split seed beam is sent to a separate EOM 20 that provides servo-phase control of the seed beams for phase-locking purposes.

Each of the modulated seed beams on the fibers 22 is sent to a fiber amplifier 24, such as a Yb-doped fiber amplifier, where the amplifier 24 will typically be a doped amplifying portion of the fiber 22 that receives an optical pump beam (not shown). All of the amplified beams are directed onto fibers 26 and sent to a beam shaper array assembly 40, discussed in detail below, that operates as a system emitter. The emitted amplified beams from the beam shaper array assembly 40 are directed as a combined amplified beam through a beam splitter 28 in a phase sensing assembly 38 that samples off a sample portion of each of the separate beams in the combined beam. The optical splitter 16 is configured to also generate a reference beam 58 that is sent to a reference beam modulator 178 that modulates the reference beam 58. The reference beam modulator 178 could include, for example, an acousto-optic modulator that shifts the center frequency of the reference beam 58, or an EOM that imparts a digital phase shift to the reference beam 58. The modulated reference beam 58 is expanded by a beam expander 78 to provide a flat wavefront and to overlap with the combined amplified beam on the beam splitter 28. The intensities of the overlapped reference and sample beams are detected by an array 30 of photodetectors 32. The main part of the combined amplified beam is sent to a beam director telescope 34 that directs an output beam 54 to a target (not shown).

The electrical signals from the photodetectors 32 are used by a phase locking controller 36 to control the EOMs 20 to correct the phase of the seed beams, using, for example, a phase-locking technique, such as optical heterodyne detection (OHD), well known to those skilled in the art. However, other phase-locking techniques (not shown) can be employed that may not require a frequency shifted reference beam, or instead using a far-field generating lens that focuses the entire beam array onto a single detector, where error signals for each channel are extracted electrically using a variety of multi-dither approaches, such as, for example, a stochastic parallel gradient decent (SPGD) algorithm, well known to those skilled in the art. The controller 36 may receive other data and information provided by box 58 to determine the phase set-points, such as wavefront aberration data or beam steering set-points. More particularly, the controller 36 provides error signals of the phase difference between the sampled beams, and provides those error signals to the EOMs 20 to control the phases of the individual seed beams so that all of the seed beams are locked in phase. In other words, the EOMs 20 provide seed beam phase control so that a "piston" phase of the combined amplified beam is spatially uniform across the beam wavefront. This also allows the phases of the seed beams to be altered relative to each other for electronic beam steering purposes. The controller 36 can also impart phase control of the beams to correct for measured atmospheric anomalies where the output beam 54 may have wavefront aberrations that are corrected as a result of propagating through the atmospheric aberrations so that the beam 54 is of the desired quality when it impinges the target.

FIG. 2 is an isometric type view of the beam shaper array assembly 40 separated from the fiber laser amplifier system 10. As will be discussed, the array assembly 40 provides nearly a 100% fill factor with uniform or tailored beam intensity across the emitting aperture of the telescope 34 with a uniform or tailored phase or phase front. The phases may be tailored for beam steering or compensation of aberrations as described above. The array assembly 40 includes an optical endcap 42 that is a monolithic block of optical glass, or a group of monolithic blocks, where ends of the fibers 26 are optically welded to an input surface 46 of the endcap 42 by suitable stems 44 that are machined into the surface 46 so that the amplified beams are emitted into the endcap 42 with minimal reflections and are precisely spaced apart with micrometer-class precision. The array assembly 40 also includes a pair of spaced apart tiled beam shaper arrays 48 and 50, where each of the beam shaper arrays 48 and 50 includes an array of close-packed tiled cells having beam shapers, one for each beam, that changes the spatial phase distribution, or wavefront, of the beam so that it is shaped in a desired manner.

FIG. 3 is a front view of the beam shaper array 48 showing an array of square tiled sub-aperture beam shaper cells 56 each having a beam shaper 52 with a surface that is shaped so that the beam is focused in the manner discussed herein, where after propagation from the beam shaper array 48 to the beam shaper array 50 the beams are altered from a round Gaussian profile to a square flat-top profile having the size of the cell 56. In other words, the beam shaper array 48 changes the phase of the beams so that as they propagate the beams flatten out and fill in spaces between the beams with light. The beam shaper array 50 includes the same configuration of cells and beam shapers as the beam shaper array 48, but the beam shapers are shaped differently so that instead of expanding the beams they change the phase front of the beams to maintain the beams in the flat-top profile as they further propagate. In this non-limiting embodiment, the sub-aperture size provided by one of the cells 56 is 2×2 mm2.

As mentioned, the beam shaper array 48 operates to change the shape of the round Gaussian-shaped amplified beams into square flat-top beams, where the square flat-top beams are positioned very close together, i.e., tiled and closely-packed, over a certain predetermined propagation distance so that there are minimal gaps between the beams to provide the desired near-100% fill factor. In other words, the Gaussian-shaped beams from the fibers 26 are positioned next to each other in a two-dimensional array by the endcap 42, and then the low intensity areas between the Gaussian peaks are filled in by the beam shaper array 48 upon propagation from the beam shaper array 48 to the beam shaper array 50 so that the beam intensity across the array of beams is constant with a minimal overlap and a minimal gap between the beams. The beam shaper array 50 is positioned at the predetermined distance from the beam shaper array 48 and operates to stop the shape changing of the beams so that the output beams from the beam shaper array 50 have a flat phase front.

FIGS. 4A-4F are beam profiles for one of the amplified beams showing how the beam profile evolves and expands as it propagates from the beam shaper array 48 to the beam shaper array 50 to go from the round Gaussian profile to a square flat-top profile. Particularly, FIG. 4A shows the profile of the beam at the output of the beam shaper array 48 as having a Gaussian profile, FIG. 4B shows the profile of the beam at 10 mm from the array 48, FIG. 4C shows the profile of the beam at 20 mm from the array 48, FIG. 4D shows the profile of the beam at 30 mm from the array 48, FIG. 4E shows the profile of the beam at 40 mm from the array 48, and FIG. 4F shows the profile of the beam at 50 mm from the array 48 at the location of the beam shaper array 50. The beam shaper array 50 then conjugates or collimates the spread out beam to remove the residual phase and divergence of the beam to provide the square flat wavefront beam. Because there is no or minimal overlap of the beams in contiguous sub-apertures, electronic beam steering is available by changing the phase of the various beams. In other words, separate beam footprints preserve the full adaptive optics capability of the fiber laser amplifier system 10.

The beam shapers 52 are shaped in both the X and Y directions relative to the Z propagation direction of the beams to obtain the necessary shape to flatten and make square the beam profile upon propagation from the array 48 to the array 50. One suitable shape of the beam shapers 52 is shown in FIG. 5, where the shape is formed on one surface. In this embodiment, the substrate material of the beam shaper 52 is fused silica, the X and Y axes each span 2 mm, and the Z axis shows the surface relief in micrometers. Alternately, separate surfaces can be shaped for the X and Y directions of the shape of the beam shaper. For example, FIG. 6 shows a suitable shape for the X direction and FIG. 7 shows a suitable shape for the Y direction. The separate X and Y direction shapes can be formed on opposite sides of the same beam shaper array or can be on one side of two adjacent beam shaper arrays. These embodiments with separated X and Y direction shapes are advantageous in comparison to combined X and Y direction shapes because they reduce the maximum surface relief of the beam shaper arrays 48 and 50, thus making them easier to fabricate with high accuracy.

In this non-limiting embodiment, the beam shaper array 48 is shown spaced apart from an output surface of the endcap 42. However, the beam shaper array 48 could be optically attached to or shaped directly on an output surface of the endcap 42. It is necessary to provide some effective free space distance between the tip of the fibers 26 welded to the input surface 46 and the beam shaper array 48 to allow for some beam expansion. As shown in FIG. 1, this effective free space could be comprised partially or entirely of propagation within a glass medium with appropriate consideration of the medium's index of refraction. The amount of effective free space between the fiber tips and the beam shaper array 48 depends on the sub-aperture pitch (spacing) between the fibers 26, the numerical aperture, i.e., divergence, of the Gaussian beam emitted from each fiber 26, and the aperture of the telescope 34, with the goal being to obtain the beam footprint size at the beam shaper array 48 to be an appreciable fraction of the pitch, but be fully contained within the sub-aperture without clipping losses. Thus, for a typical large mode area fiber having a numerical aperture, i.e., half-angle divergence, of 0.03 radians and for a pitch of 2 mm, the effective free space distance between the fiber tips and the beam shaper array 48 would be about 10 mm.

Although the pair of beam shaper arrays 48 and 50 should in theory be able to provide the desired beam shaping as described, in practice there is likely to be various wavefront aberrations and errors in the beam intensity profile at the output of the beam shaper array 50 caused by manufacturing tolerances of the assembly 40, which may in turn be driven in part by manufacturing tolerances of the arrays 48 and 50 and the endcap 42, and their relative alignments, which may be able to be measured for a specific assembled set of components.

FIG. 8 is an isometric type view of the beam shaper array assembly 40 separated from the fiber laser amplifier system 10, where a trim beam shaper array 62 is provided adjacent to the beam shaper array 50 that includes an array of trim beam shaper elements 64 that are shaped to provide wavefront corrections based on the measurements to provide the reverse of the aberrations. Each of the trim beam shaper array elements 64 within the array 62 may be different from the others based on measured errors. The assembly 40 also includes a trim beam shaper array 66 that is provided adjacent to the beam shaper array 48 that includes an array of trim beam shaper elements 68 that are shaped so that after propagation of the beams from the beam shaper array 48 to the beam shaper array 50 any non-uniformity in the intensity distribution measured at the output of the beam shaper array 50 will be corrected. Each of the elements 68 within the array 66 may be different from the others based on measured errors. Alternately, or in addition, the wavefront aberrations of individual components, such as, for example, the arrays 48 and 50, or an assembled fiber endcap array comprising the fibers 26, the connectors 44 and the endcap 42 can be measured separately and the trim beam shaper arrays 62 and 66 can also be provided adjacent to the arrays 48 and 50, respectively.

In the embodiment discussed above, the beam shaper arrays 48 and 50 are discrete elements. In an alternate embodiment, the two beam shaper arrays can be provided on opposing faces of a single optical block that has the necessary thickness so that the low fill factor beams are converted to the flat-top high fill factor beams as the beams propagate through the block. This embodiment is illustrated in FIG. 9 showing a side view of a beam shaper array assembly 70 including an optical block 72, an input beam shaper array 74 optically adhered to or shaped directly on an input surface of the block 72 and an output beam shaper array 76 optically adhered to or shaped directly on an output surface of the block 72, where the beam shaper array 74 would be spaced from or attached to the endcap 42 to provide an effective free space distance between the tips of the fibers 26 welded to the input surface 46 and the beam shaper array 74. Similarly, the beam shaper array 48 could be shaped directly on the surface of the endcap 42. These embodiments are advantageous because they reduce the number of surfaces the high power beams pass through, thus reducing optical power losses from unwanted scattering or back reflections.

In the above embodiment, the beam shaper arrays 48 and 50 are square. In other embodiments, it may be desirable to maintain the square tiling of the individual beam shapers and beams, but make the outer shape of the combined beam to more closely match the shape of the aperture of the telescope 34. FIG. 10 is a front view of a beam shaper array 80 that can be used as the arrays 48 and 50 and having a number of square beam shaper cells 82 including beam shapers, where the cells 82 are tiled so that an outer edge 86 of the beam shaper array 80 more closely matches a round aperture. Further, in certain fiber amplifier systems of the type described herein, the main aperture of the telescope 34 may have a center obscuration, such as for accommodating a secondary mirror. In order to address this issue, the beam shaper array 80 can have a center opening 88 where no beams would propagate so as to not waste beam power that would otherwise impinge the obscuration.

Although it has been suggested above that all of the cells 56 have the same square shape, in other designs it may be desirable to control the power or intensity of the combined beam in different areas, such as at the center, where the outer cells may have a different shape that the inner cells, such as some cells being square and other cells being rectangular, to adjust the beam power accordingly. This embodiment is illustrated in FIG. 11 showing a front view of a beam shaper array 90 that can be used as the arrays 48 and 50 and having a number of square inner beam shaper cells 92 having beam shapers 94 and a number of rectangular outer beam shaper cells 96 having beam shapers 98.

Also, the cells 56 do not all need to be the same size, where different sized cells may better accommodate an outer or inner circumference shape, such as shown in FIG. 10. This embodiment is illustrated in FIG. 12 showing a front view of a beam shaper array 100 that can be used as the arrays 48 and 50 and having a number of square beam shaper cells 102 with beam shapers 104 of one size and a number of square beam shaper cells 106 with beam shapers 108 of another size.

Although it has also been suggested above that all of the cells 56 are arranged in a rectilinear array, in other designs it may be desirable to arrange the cells in an array with non-rectilinear shapes. For example, a close-packed hexagonal array of hexagonally shaped cells may be advantageous to better fill a circular beam director aperture than a rectilinearly shaped cell. Furthermore, a more general application of varied cell shapes may be desirable to better accommodate the aperture boundaries.

Figures 12, 13, 14:
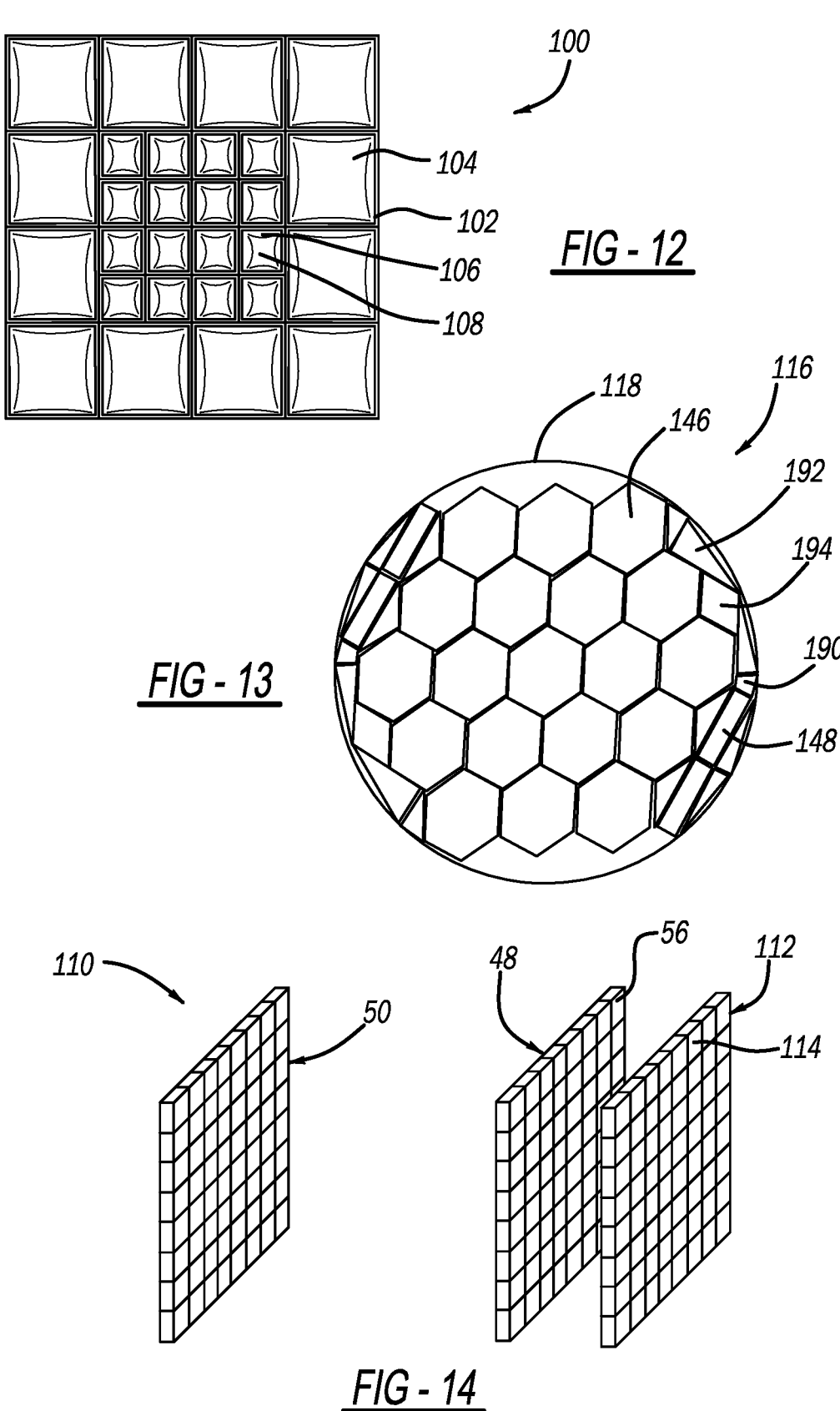
FIG. 12 is a front view of a beam shaper array having beam cells of different sizes.
FIG. 13 is a front view of a beam shaper array having beam cells of different sizes and shapes for a round aperture.
FIG. 14 is an isometric type view of a beam shaper array assembly of the type shown in FIG. 2 and including a diode laser bar beam source.

FIG. 13 is a front view of a beam shaper array 116 that can also be used as the arrays 48 and 50 having an outer substantially circular circumference to conform to a circular aperture 118 that illustrates these features. The array 116 includes a variety of specially shaped beam shaper cells including hexagonal cells 146, rectangular cells 148, trapezoidal cells 190, triangular cells 192 and diamond-shaped cells 194 to provide the circular shape.

It is noted that although the above embodiments use an array of fiber emitters, alternate embodiments may use other types of laser emitters, such as diode laser emitters, where the number of emitters could be significantly increased. More specifically diode lasers are often fabricated lithographically in semiconductors where the lasers can be closely arranged. FIG. 14 is an illustration of a laser system 110 that generalizes the type of lasers that can be employed, where an emitter array 112 is provided at the input side of the beam shaper array 48 and includes diode lasers 114.

Although it has also been suggested above that the desired output intensity distribution after the beam shaper array 50 has a flat top for each of the array cells, for some applications this may not be desirable. For example, if it is desired to synthesize a tiled array with an intensity distribution that tapers to a low value near its perimeter so as to minimize far-field sidelobes with the central cells of the tiled arrays exhibiting higher intensity than the perimeter cells, as would be the case, for example, using the configurations of the beam shaper arrays 90 and 100, then it may also be advantageous to taper the intensity distribution internal to some or all of the cells within the array so that their intensity is larger near the edge of the cell closest to the center of the array, and smaller near the outer edge of the cell at the outer boundary of the array, such as the array 90, or near the inner edge of an annular ring, such as the center opening 88. This can be accomplished by tailoring the design of the beam shapers in the two beam shaper arrays to yield the desired tapered intensity distribution, which can be unique for each element of the array.

Figure 15:
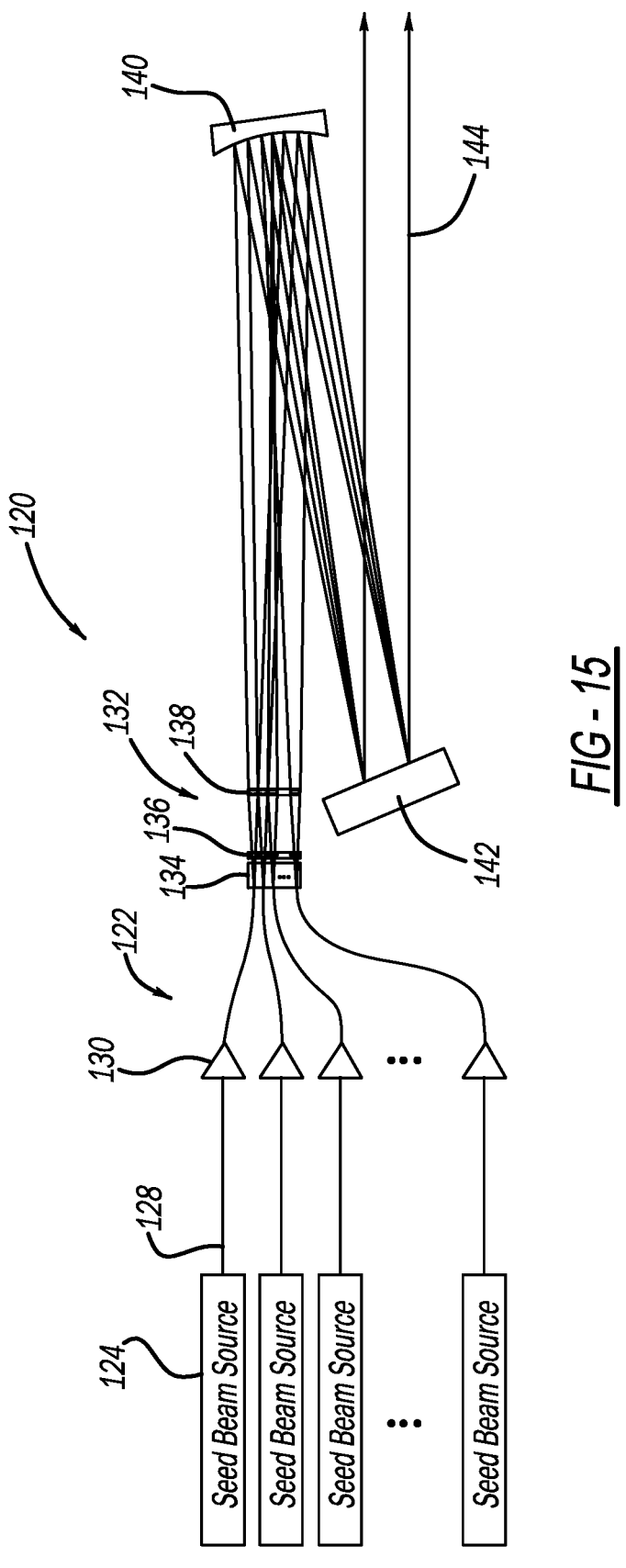
FIG. 15 is a schematic block diagram of an SBC fiber laser amplifier system that includes a one-dimensional beam shaper array assembly similar to the beam shaper array assembly shown in FIG. 2.

A beam shaper array assembly similar to the beam shaper array assembly 40, but that does not employ coherent combining by phase locking can also be employed in SBC fiber laser amplifier architectures. FIG. 15 is a schematic block diagram of an SBC fiber laser amplifier system 120 illustrating such an architecture that includes N number of wavelength channels 122 each having a seed beam source 124 that generates a continuous wave frequency-modulated seed beam having a center wavelength A on a fiber 128 for the particular channel 122, where each seed beam source 124 generates a different beam wavelength $\lambda_1$-$\lambda_N$. Each of the seed beams on the fibers 128 is sent to a fiber amplifier 130, such as a Yb-doped fiber amplifier, where the amplifier 130 will typically be a doped amplifying portion of the fiber 128 that receives an optical pump beam (not shown). All of the amplified beams are directed to a one-dimensional beam shaper array assembly 132 that is similar to the beam shaper array assembly 40, but does not provide phase locking as discussed above because all of the beams have different wavelengths.

Figure 16:
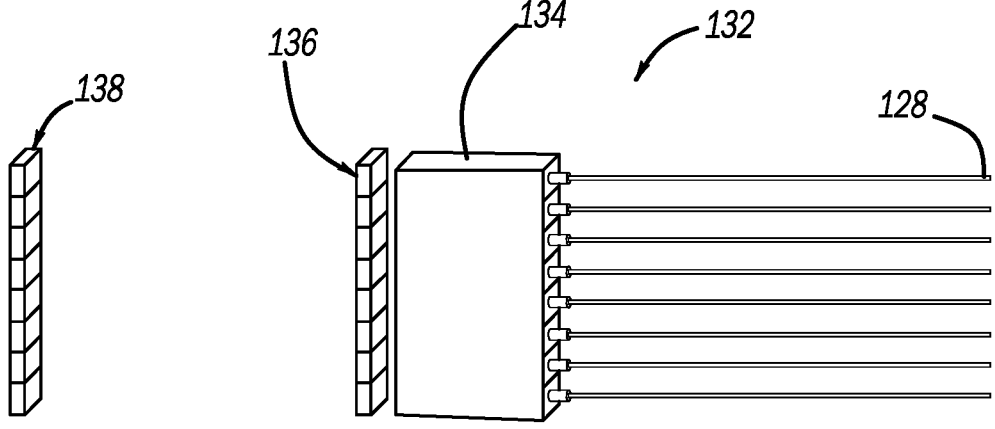
FIG. 16 is an isometric view of the one-dimensional beam shaper array assembly separated from the amplifier system shown in FIG. 15.

FIG. 16 is an isometric view of the one-dimensional beam shaper array assembly 132 separated from the amplifier system 120. The beam shaper array assembly 132 is a one-dimensional array having one row of fibers along a combining axis that provides beam shaping that may differ between the combining dispersive axis and the orthogonal non-combining, non-dispersive axis. Along the combining axis, the beam shaping is not necessarily intended to provide a fully filled rectangular aperture, but can be more of a hyper-Gaussian or similar shape with a higher fill factor than the input beam shape, and with a smoothly tapered intensity profile. The beam shaper array assembly 132 flattens out the intensity distribution of the beams from each fiber 128 to increase the fill factor. More specifically, the beam shaper array assembly 132 includes an endcap 134 to which the fibers 128 are coupled, a beam shaper array 136 that includes beam shapers that spread out the beam intensity in a similar manner as the array 48 as shown in FIGS. 4A-4F, and a beam shaper array 138 that includes beam shapers that stops the beam spreading in the same manner as the array 50 so that the beam shaper array assembly 132 outputs a set of wavelength-diverse amplified high fill factor beams into free space, where the individual beam wavelengths $\lambda_1\lambda_N$ are propagating from slightly different emitter positions.

The high fill factor beams are reflected off of a set of collimating optics 140 that collimates the diverse beams and directs them onto an SBC grating 142 so that all of the individual beams impact the grating 142 and overlap on the same footprint. The grating 142 spatially diffracts the individual beam wavelengths $\lambda_1$-$\lambda_N$ and directs the individual amplified beams in the same direction as a combined output beam 144.

SBC beam quality is limited by angular dispersion from the diffraction grating 142. Since the individual fiber amplifiers have a finite optical linewidth owing to frequency modulation, power will be spread into different directions following diffraction from the diffraction grating 142. If the span of these different directions is significant compared to the diffraction limited angle, then the beam quality will degrade. The degradation in beam quality can be minimized by decreasing the size of the beam footprint on the grating 142 along the combining dispersive axis, which increases the diffraction limited angle. Since the grating 142 is at a Fourier plane of the array 138, this corresponds to an increase in the individual beam sizes at the array 138. Hence, a high spatial fill factor along the combining axis of the array 138 provides improved beam quality. With an array of Gaussian beams, the fill factor at the array 138 cannot be increased without clipping the wings of the Gaussian beams leading to lost power. With an array of shaped high fill factor beams, for example, an array of hyper-Gaussian shaped beams, the spatial fill factor of the array 138 can be increased without incurring clipping losses, thus leading to improved beam quality without loss of power.

For the SBC configuration of the laser system 120, the shape of the beams output from the array 138 will optimally be identical for all of the beams. However, the beam shapes may be different along the combining and the non-combining axes. Along the combining axis the beams may be shaped as discussed above to provide a higher fill factor to minimize beam quality loss due to angular dispersion. Along the non-combining axis, the beams may, for example, be left unshaped to generate a near-Gaussian beam profile on the grating 142. This can be advantageous to maximize power on a far-field target whose size is between 1× and 2× diffraction-limited (DL), since it minimizes power diffracted into far-field sidelobes at angles larger than 2× diffraction-limited. Alternatively, the beams may be shaped along the non-combining axis to generate a high fill factor profile on the grating 142, with intensity tapering to near zero at the telescope aperture. This can be advantageous to fully fill a beam director telescope to maximize far-field peak intensity on a target whose size is less than 1× diffraction-limited while minimizing clipping losses on the telescope aperture. The dispersive impact of the grating 142 can be minimized on output beam quality by choosing the beam shaper arrays 136 and 138 and the set of collimating optics 140 so that the shaped beams incident on the grating 142 are narrow in the dispersive direction, but wider in the orthogonal non-dispersive direction. This asymmetric configuration lowers the peak irradiance on the grating 142 while also minimizing the degradation of the combined beam quality.

The number of the fibers that are coupled to the endcap 42 is generally limited by the mechanical limitation of the ability to couple closely-spaced fibers to the endcap 42. The number of beams that can be combined in both SBC and CBC architectures is limited for other reasons. In particular, the one-dimensional linear fiber array required for SBC may be impractically large. However, the limitations of providing CBC and SBC combined beams can be increased by a hybrid fiber laser amplifier architecture that combines both CBC and SBC architectures. This can be accomplished by providing CBC combined beams in one direction and SBC combined beams in an orthogonal direction. This combined CBC and SBC architecture can then be improved with the beam fill factor provided by the beam shaper array assembly 40 or the beam shaper array assembly 132 discussed above.

Figure 17:
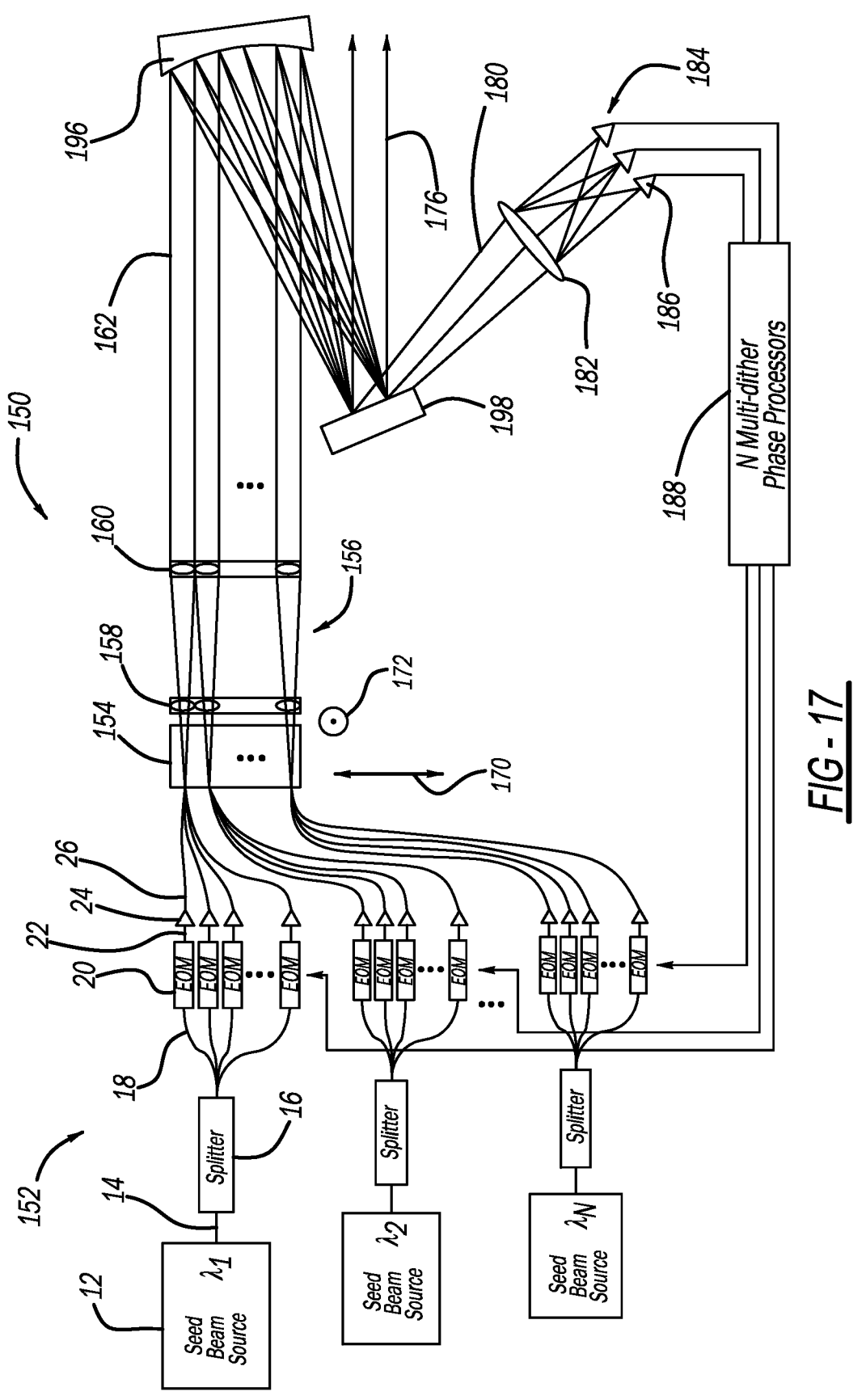
FIG. 17 is a schematic block diagram of a hybrid CBC and SBC fiber laser amplifier system that includes a beam shaper array assembly of the type shown in FIG. 2 and includes multi-dithered sample beam phase-locking.

Several architectures can be employed to measure the beam phases in a hybrid CBC and SBC fiber laser amplifier system. FIG. 17 is a schematic block diagram of a hybrid CBC and SBC fiber laser amplifier system 150 illustrating one such architecture, where like elements to the system 10 are identified by the same reference number. The system 150 includes N number of SBC channels 152, where each channel 152 includes a separate grouping of the seed beam source 12 having wavelength $\lambda_i$, where i is in the range 1≤i≥N, the splitter 16, the EOMs 20 and the amplifiers 24 as shown in the system 10. As such, the ith channel 152 includes a single wavelength $\lambda_i$ seed beam that is split into M multiple seed beams that are separately amplified and of the same wavelength A1, where there are N groups of M EOMs 20 and all of the channels 152 together generate M×N seed beams that are amplified at each of the different beam wavelengths $\lambda_i$-$\lambda_N$. All of the M×N fibers 26 are coupled to an endcap 154 that is part of a beam shaper array assembly 156 including an input beam shaper array 158 and an output beam shaper array 160 of the type shown in FIG. 2 that outputs M×N output beams 162.

Figure 18:
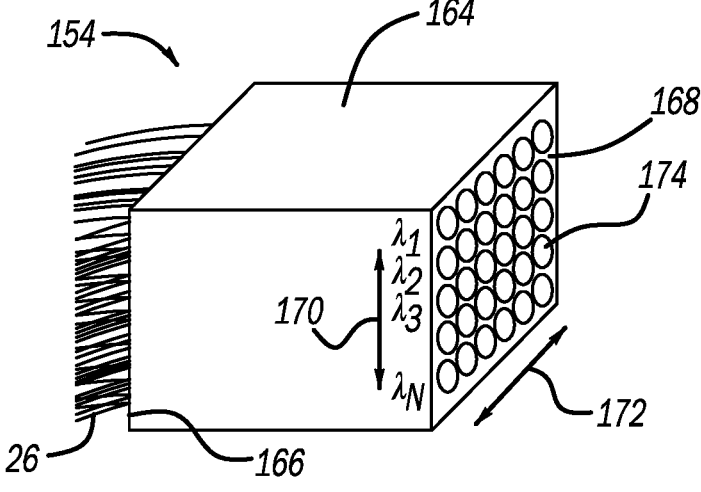
FIG. 18 is an isometric view of an endcap for the beam shaper array assembly shown in FIG. 17.

FIG. 18 is an isometric view of the endcap 154 separated from the system 150. The endcap 154 includes an optical block 164 having an input side 166 and an output side 168, where a non-dispersive CBC axis identified by arrow 172 is defined along one side of the block 164 and is perpendicular to the plane of the paper in FIG. 17 and a dispersive SBC axis identified by arrow 170 is defined along a perpendicular side of the block 164 and is into the plane of the paper in FIG. 17. The fibers 26 are optically coupled to the input side 166 of the block 164 and a beam 174 from each fiber 26 is shown at the output side 168 of the block 164, where the beams 174 in each row along the CBC axis 172 have the same wavelength A1 and are provided by one of the channels 152, and the beams 174 in each column along the SBC axis 170 comprise the multiple wavelengths $\lambda_i$-$\lambda_N$ and are provided by different ones of the channels 152. The beam shaper arrays 158 and 160 that receive the beams will have cells and beam shapers configured in the manner discussed above so that phase-locking of the beams occurs along the CBC axis 172 and beam intensity flattening occurs to increase the fill factor along the SBC axis 170.

The M×N beams 162 from the beam shaper array 160 are collimated by a cylindrical optical system 196 and directed onto a diffraction grating 198 that operates in a similar manner to the diffraction grating 142. The optical system 196 has curvature along the dispersive SBC axis 170 in the plane of the page. The focal length of the optical system 196 is selected to ensure that all of the N different wavelengths $\lambda_i$ are incident at the correct angles to the grating 198 such that all of the diffracted output beams from the grating 198 are co-propagating in the same direction with the highest precision possible. As a result, a combined output beam 176 from the grating 198 comprises M parallel beams tiled along the CBC axis 172, which is orthogonal to the page, and will have phase control of the individual beams along one axis and spatially diffracted beams along a perpendicular axis.

Also reflected from the grating 198 is a weak specular 0th order beam 180, which is focused by a lens 182 onto a detector array 184 having individual detectors 186. Because the wavelength groups comprising the beam 180 propagate at different angles in a linear array, the focused beams from the lens 182 for each wavelength group are separated along a line and can be directed to a linear array of the detectors 186. Each of the N detectors 186 receives the overlap of the M focused CBC beams comprising each wavelength group. The intensity on each detector 186 is maximized by a multi-dither processor 188 that provides dither signals superimposed with phase-locking control signals to the corresponding EOMs 20 for each wavelength group using, for example, an SPGD algorithm.

Figure 19:
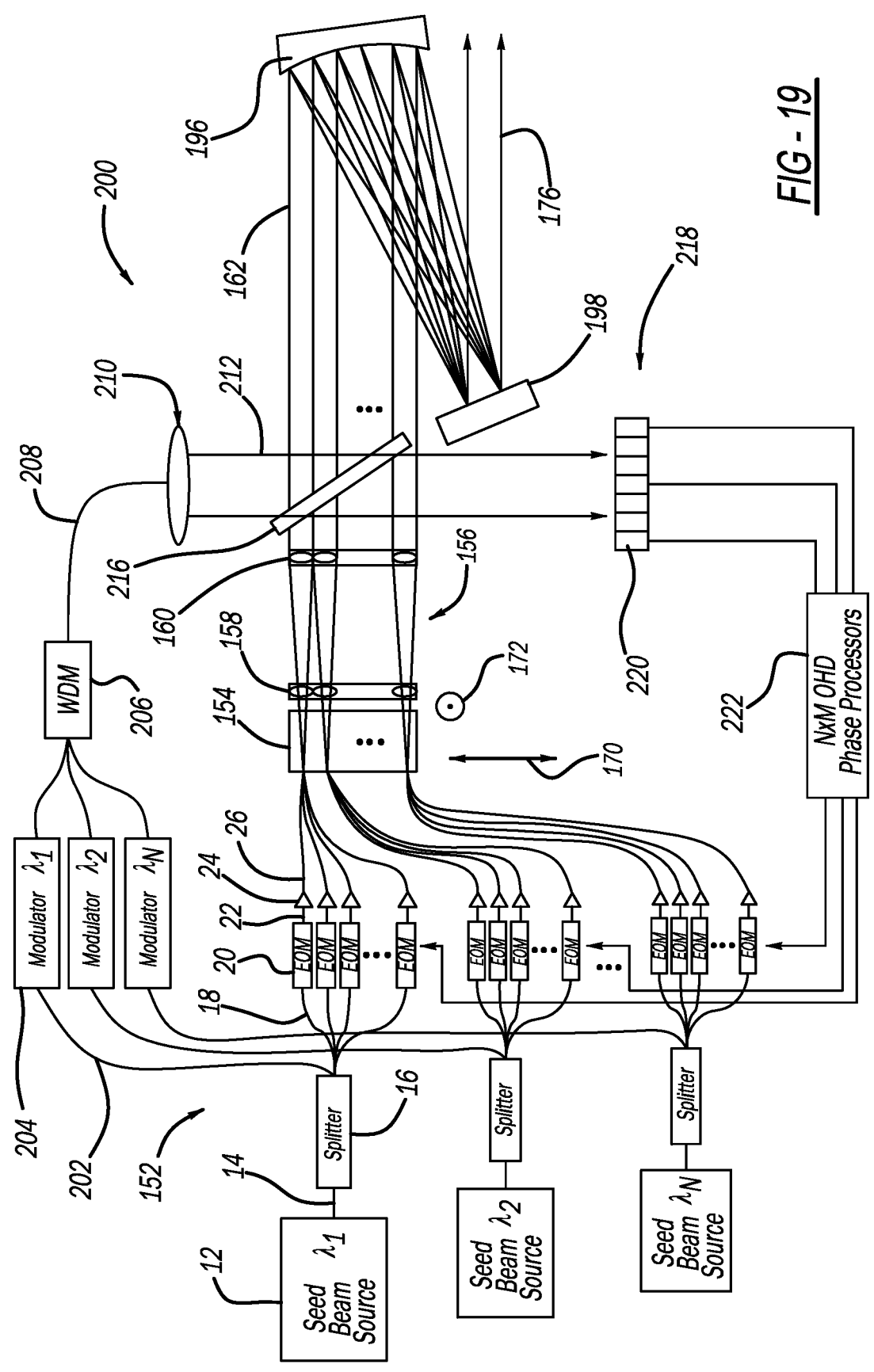
FIG. 19 is a schematic block diagram of another hybrid CBC and SBC fiber laser amplifier system that includes a beam shaper array assembly of the type shown in FIG. 2 and includes optical heterodyne detection phase-locking.

FIG. 19 is a schematic block diagram of another hybrid CBC and SBC fiber laser amplifier system 200 that is similar to the amplifier system 150, except for phase sensing and control features, where like elements to the system 150 are identified by the same reference number. In this embodiment, the splitters 16 provide a reference beam 202 to be used as a reference for each wavelength group. Each reference beam 202 is modulated by a modulator 204, and all of the modulated reference beams 202 are combined by a wavelength division multiplexer (WDM) 206 onto a single fiber 208, and then collimated by a lens 210 to form a large multi-color planar reference beam 212. The planar reference beam 212 is combined by sample optics 216 with a small sample of the M×N beams 162 transmitted from the beam shaper array 160.

The combined reference beam 212 and the sampled M×N beams 162 are received by a 2D M×N detector array 218 including individual detectors 220, where wavelength filters (not shown) may be employed in the array 218 to eliminate noise from the reference beams 212 having wavelengths other that the correct wavelength A1 intended for a given detector 220. Alternately, the detector array 218 can be AC-coupled to reject DC photocurrent arising from the reference beams having wavelengths other than the correct wavelength intended for a given detector 220. The heterodyne interference signal from each detector 220 in the array 218 is transmitted to an OHD processor 222 that provides phase correction signals to the EOMs 20 to phase lock each group of M beams at each wavelength $\lambda_i$.

It is noted that although the amplifier systems 150 and 200 provide specific phase control approaches, this is non-limiting in that other approaches may be suitable. The essential element in the hybrid fiber laser amplifier systems 150 and 200 is that the CBC beams need to be phase locked together with the desired phase profile similar to the system 10. The essential difference in the hybrid systems 150 and 200 is that the CBC beam is only in one dimension, since the beams in the other dimension are spectrally combined.

It was mentioned above that the beam shaper array assembly 40 may not be manufactured with enough accuracy to prevent significant and various wavefront aberrations and errors from occurring in the beam because it is very difficult to obtain the necessary optical alignment precision for the beam shaper array assembly 40 in the various embodiments discussed above. For example, the known fabrication processes for welding the fibers 26 to the stems 44 is generally not accurate enough to completely prevent both position and angle errors, which leads to beam deviations. Additional errors that could occur at lens fabrication and integration from mechanical tolerances also leads to launcher array beam deviations. Errors can generally be corrected at three different locations along the optical path, namely, changing the weld joint between the fibers 26 and the stems 44, changing the beam shaper array assembly 40 and providing trim plates, such as the trim beam shaper arrays 62 and 66. One way to correct these wavefront aberrations is to measure the aberrations and provide the trim beam shaper arrays 62 and 66, as discussed above. However, other techniques can also be employed to correct the aberrations. A detailed discussion of some of these techniques is discussed below.

Figures 20, 22:
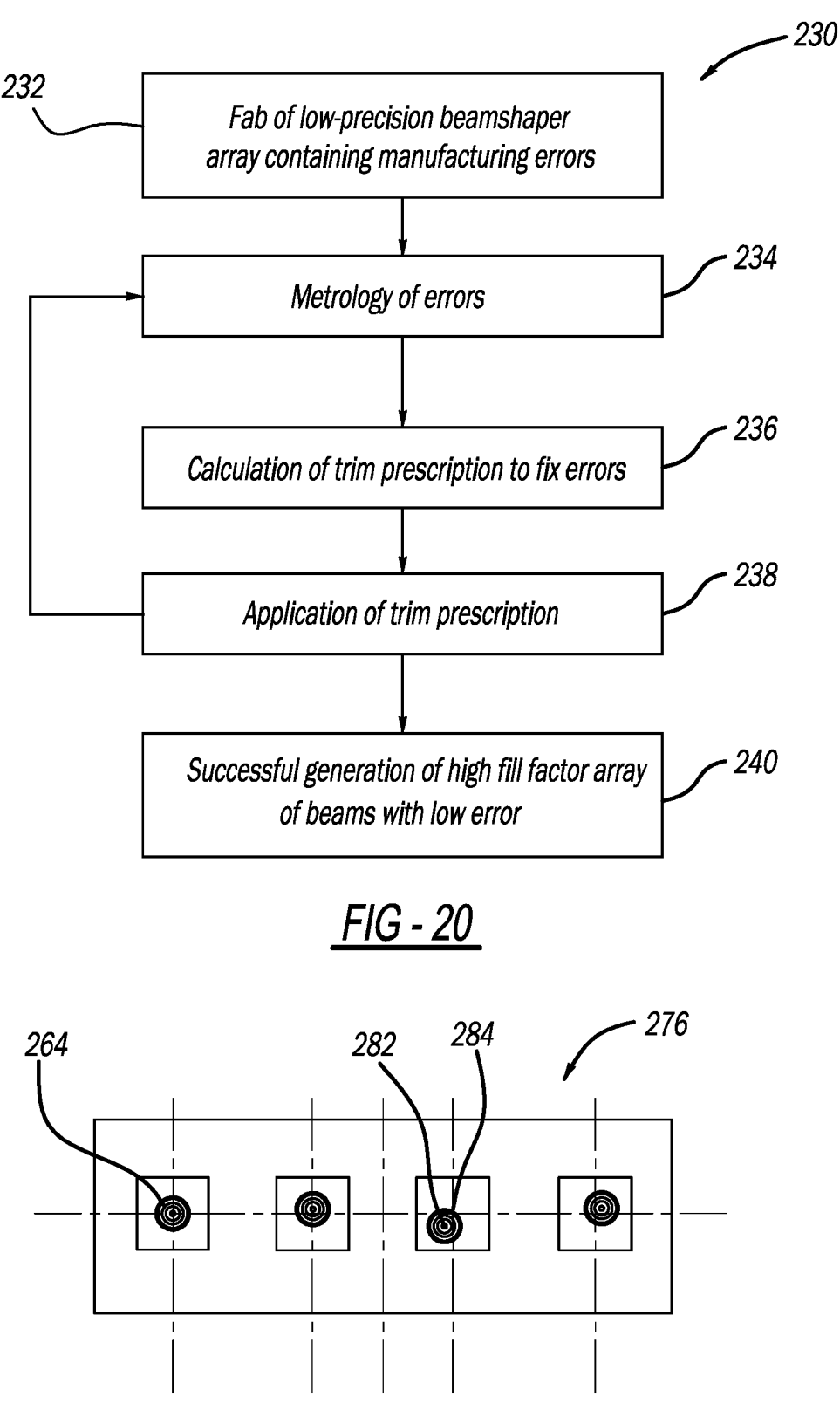
FIG. 20 is a flow chart diagram showing a process for process for fabricating a beam shaper array assembly.
FIG. 22 is a front view of a near-field image showing beam position errors.

FIG. 20 is a flow chart diagram 230 outlining the general process of fabricating and correcting an optical element, and in particular the beam shaper array assembly 40. At box 232, the optical element, for example, the assembly 40, is fabricated using an inexpensive and low precision fabrication process where significant manufacturing errors likely will be present in the assembly 40. During this process step for fabricating the assembly 40, the endcap 42 with the stems 44 is provided and the fibers 26 are optically welded to the stems 44 to form an emitter array, such as a 1D emitter array. A number of the 1D emitter arrays can be assembled together to form, for example, a 2D emitter array. The 1D or 2D emitter array is then integrated with, for example, the beam shaper arrays 48 and 50. At box 234, wavefront errors caused by, for example, the assembly 40 are measured using, for example, an optical system that creates an image relay onto a sensor of the distribution from the plane of the beam shaper array 48, the plane of the beam shaper array 50 and the far-field plane, where the sensors can be a camera for measuring irradiance distributions or an interferometer for measuring wavefront distributions. At box 236, calculations are made for prescriptions and remedies that are used to correct the errors. At box 238, a suitable process is performed to correct the errors based on the prescriptions, such as remanufacturing the beam shaper array assembly 40, providing stand-alone optical trim plates, changing the fiber emitter position and angle trimming, etc. If additional corrections are required, then the process returns to the box 234 to again measure the wavefront errors. If the corrections are successful, the beam shaper array assembly 40 is accurate and operational at box 240.

The various steps discussed above for fabricating the optical element can be performed by a number of suitable methods and processes. Some of those processes are discussed below, some of which may be related to U.S. Pat. No. 10,267,992 issued Apr. 23, 2019 to Goodno et al., titled Fiber Launcher, assigned to the assignee of this application and herein incorporated by reference.

Figures 21, 23:
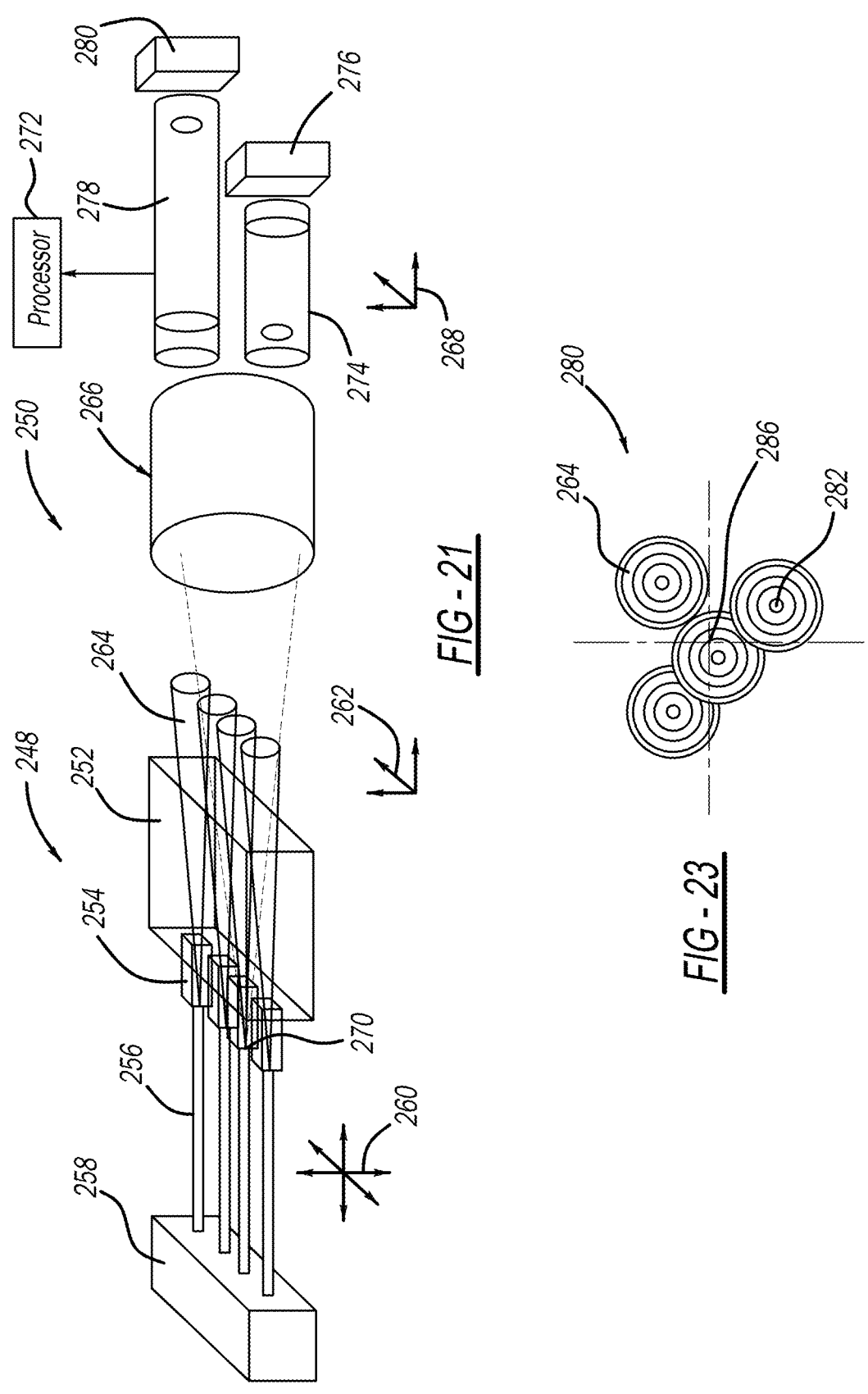
FIG. 21 is an illustration of a 1D optical assembly showing a process for welding fibers to an endcap and measuring beam angle and position errors using a telescope and microscope.
FIG. 23 is a front view of a far-field image showing beam angle errors.

FIG. 21 is an illustration of a 1D optical assembly 250 including an endcap 252 having machined stems 254 to which fibers 256, four of which are shown as being representative, will be optically welded using any suitable optically welding process, such as a plasma arc from high voltage electrodes, CO2 laser beams, H2+O2 flames, graphite filament, tungsten filament, etc., to form an emitter array 248. The assembly 250 includes a stationary optical imaging system 266 that is capable of micrometer level resolution that is calibrated relative to global coordinates represented by arrows 268. The endcap 252 is positioned on a translational stage represented by arrows 262 to match endcap coordinates to the global coordinates 268 by precision translation and imaging of optical fiducials associated with the endcap 252 to define an imaging point 270 at the end of each stem 254 where the fiber 256 will be welded. Prior to the fibers 256 being welded to the stems 254, the fibers 256 are mounted on a translational stage represented by arrows 260, where the fibers 256 are disconnected from the translational stage 260 once the fibers 256 are welded to the stems 254. An optical source 258 provides optical beams 264 having optical modes propagating along the core of the fibers 256 that will be used to align the fibers 256 to the stems 254 using the imaging system 266 and the imaging point 270. A particular fiber 256 being attached to a particular stem 254 is illuminated by the beam 264 and is moved on the stage 260 to the particular stem 254 guided by imaging the optical beam mode location relative to the endcap coordinates 262. The fiber tip and the stem tip are melted locally and joined by automated jigs (not shown). After the melted joint is cooled, the mechanical hold of the fiber 256 is released. These steps are repeated for each fiber 256 until all of the fibers 256 are connected to the endcap 252.

Once the fibers 256 are welded to the stems 254, the next step can be to determine position and angle errors of the fibers 256 relative to the global coordinates 268 by measuring the location, orientation and angle of each of the beams 264 being emitted from the fibers 256. The emitter array 248 can be moved with precision encoders to a desired location. In order to obtain these measurements, a microscope 274 is used to provide a near-field image 276 of the beams 264 to determine the position errors of the beams 264 and a telescope 278 is used to provide a far-field image 280 of the beams 264 to determine the pointing direction (angle) errors of the beams 264. A processor 272 can be used to calculate a correction for each fiber 256 for the measured angle error and the position error.

FIG. 22 is a front view of the near-field image 276 of the beams 264 where the beams 264 are being emitted from the fibers 256 and showing an error in the x and y direction between the center point 282 of the beam 264 and an ideal x, y position 284. FIG. 23 is a front view of the far-field image 280 showing an error in the x, y direction of the center point 282 of the beam 264 relative to a target center point 286. Lenses (not shown) can be used to correct these errors.

Figures 24, 25:
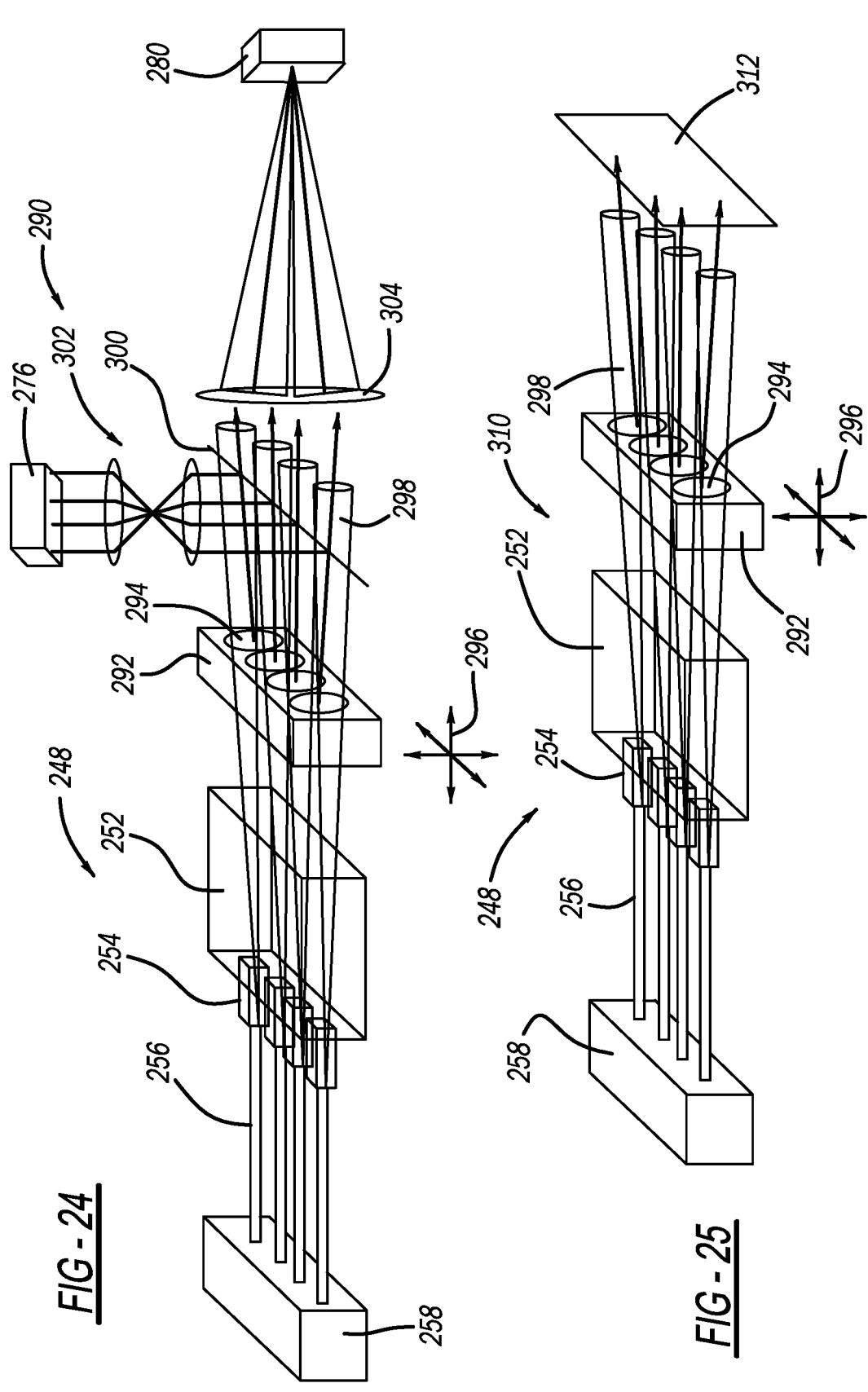
FIG. 24 is an illustration of a 1D optical assembly showing a process for measuring beam angle and position errors for a beam shaper array assembly using optical elements to image beams in the far-field and the near-field.
FIG. 25 is an illustration of a 1D optical assembly showing a process for measuring beam angle and position errors for a beam shaper array assembly using an interferometer.

FIG. 24 is an illustration of a 1D optical assembly 290 similar to the optical assembly 250, where like elements are identified by the same reference number. The assembly 290 determines the position and angle errors of the beams 264 in the near-field and the far-field when an optical beam shaper element 292 having lenses 294, representing, for example, one of the arrays 48 or 50, is positioned next to the endcap 252. In this design, the element 292 is mounted to a translational stage represented by arrows 296. The beams 264 are generally output from the element 292 as collimated beams 298. The collimated beams 298 are split by a beam splitter 300 and one split beam is sent to image relay optics 302 to generate the near-field image 276 and the other split beam is focused by a lens 304 in the far-field to generate the far-field image 280, where the near-field image 276 and the far-field image 280 are at the image plane of the element 292 and not at the tip of the fibers 256, and where the image plane could be at the beam shaper array 50.

The position and angle errors of the beams 264 can also be measured using interferometry. FIG. 25 is an illustration of a 1D optical assembly 310 illustrating this, where like elements to the assembly 290 are identified by the same reference number. In this design, an interferometer 312 is provided downstream of the beam splitter 300. A front view of an image 316 generated at the interferometer 312 is shown in FIG. 26, and shows an interference pattern 318 of each of the collimated beams 298. An offset error between a center of the interference pattern 318 and a desired position can be used to correct the beam position and angle.

FIGS. 27A-27D are illustrations of an emitter array 320, where like elements to the assembly 290 are identified by the same reference number, showing a process for correcting the beam pointing deviation angle of the fibers 256. The pointing angle error of the beam 264 is measured using any suitable process, such as those discussed above, as shown in FIG. 27A, to determine the direction and magnitude for bending the fiber 256 to make a pointing correction. The measurement is used to determine a static force 324 to be applied to the fiber 256 some distance away from a weld joint 322, such as tens of millimeters, between the fiber 256 and the stem 254 to bend and hold the fiber 256 in the direction opposite to the angle error, as shown in FIG. 27B, where the angle error of the beam 264 does not change when the fiber 256 is bent. Localized heating 326 is applied to the stem 254 near the weld joint 322 of the fiber 256 and the stem 254 by any suitable technique that is sufficient to soften the glass, but not melt it, as shown in FIG. 27C. Upon softening, the glass will deform in response to the force 324 causing the beam pointing angle to change until the internal stresses created by the force 324 are relaxed. The heating is stopped, the weld joint 322 cools, and then the force 324 is removed. The glass deformation causes the beam pointing angle to change because of the fiber angle change at the weld joint 322, as shown in FIG. 27D. The process is repeated until the beam pointing direction is within a certain tolerances.

FIGS. 28A-28C are illustrations of an emitter array 330, where like elements to the assemblies 290 and 320 are identified by the same reference number, showing a process for correcting the position error of the fibers 256. A beam position error 332 of the beam 264 is measured using any suitable process, such as those discussed above, as shown in FIG. 28A, to determine a stem shape changing direction and magnitude. A static force 334 by, for example, a sapphire rod having a very high melting point and being compatible with high voltage, is applied to the stem 254 at the weld joint 322 in a direction opposite to the beam position deviation. Because of the proximity to the high temperature glass and the heat source, the device applying the force in physical contact to the stem 254 needs to be compatible with the high temperature and high voltage local environment while not introducing contamination to the surrounding glass. Localized heating 326, as shown in FIG. 28B, is applied to the stem 254 sufficient to soften the glass, but not reach melting, thus enabling the stem 254 to deform by the static force. The heating is stopped, the weld joint 322 cools, and then the force 334 is removed. The glass deformation causes the beam position deviation to change because of the shape of the stem 254, as shown in FIG. 28C. This process is repeated until the beam position deviation is within the desired tolerance.

Figures 29, 30:
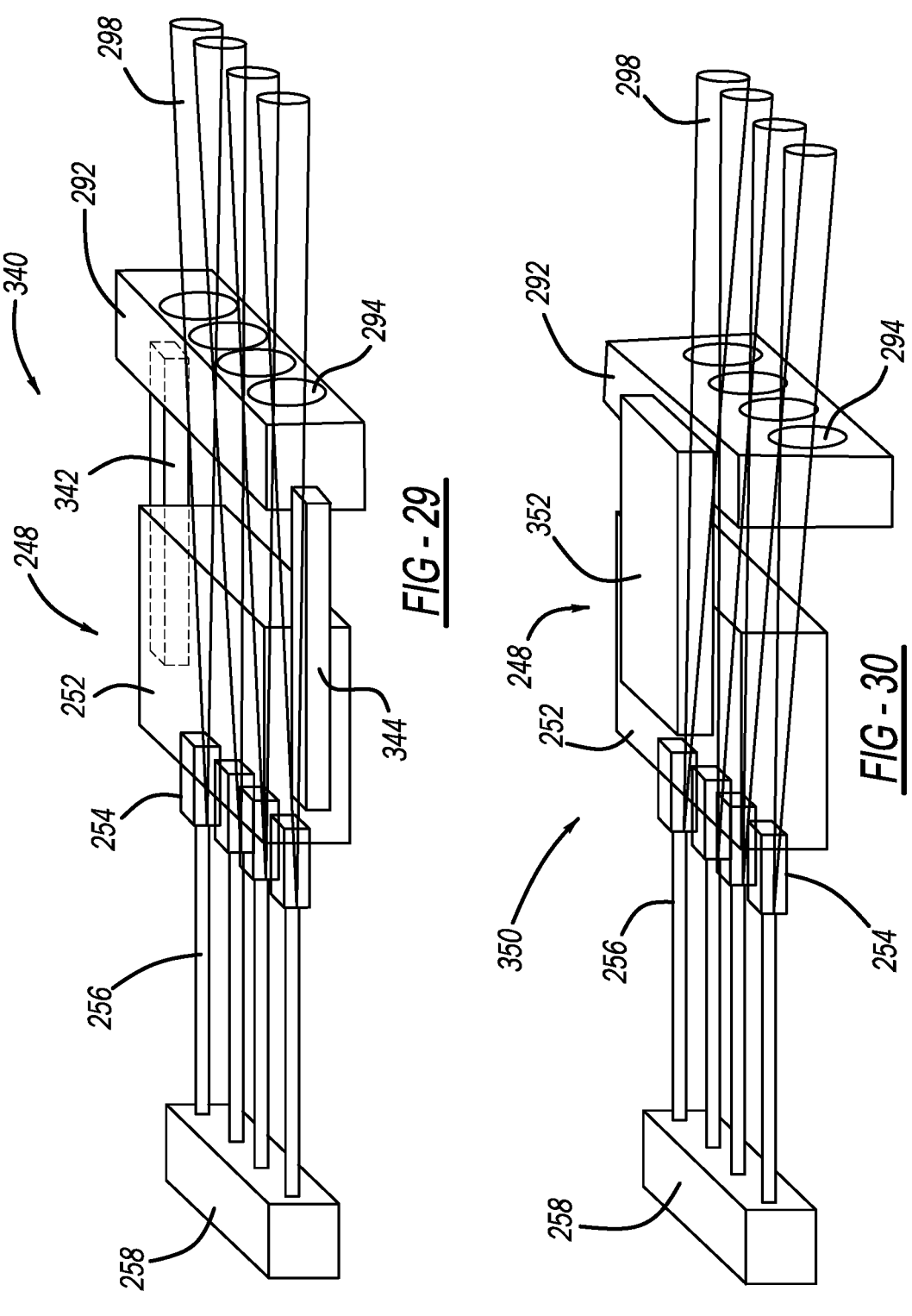
FIG. 29 is an illustration of the optical assembly showing an endcap being coupled to the optical element by opposing side bridges.
FIG. 30 is an illustration of the optical assembly showing an endcap being coupled to the optical element by a top bridge.

Once the proper position of the element 292 is set relative to the endcap 252 and is held there by a fixture (not shown), the element 292 needs to be connected to the endcap 252 as part of, for example, the assembly 40. FIG. 29 is an illustration of a 1D optical assembly 340, where like elements to the assembly 290 are identified by the same reference number, showing the element 292 connected to the endcap 252 by opposing side bridges 342 and 344 at side surfaces of the endcap 252 and the element 292. FIG. 30 is an illustration of a 1D optical assembly 350, where like elements to the assembly 290 are identified by the same reference number, showing the element 292 connected to the endcap 252 by a top bridge 352 at top surfaces of the endcap 252 and the element 292. The bridges 342, 344 and 352 can be secured to the endcap 252 and the element 292 by any suitable manner, such as glue, weld, diffusion bond, optical contact, etc.

Figure 31:
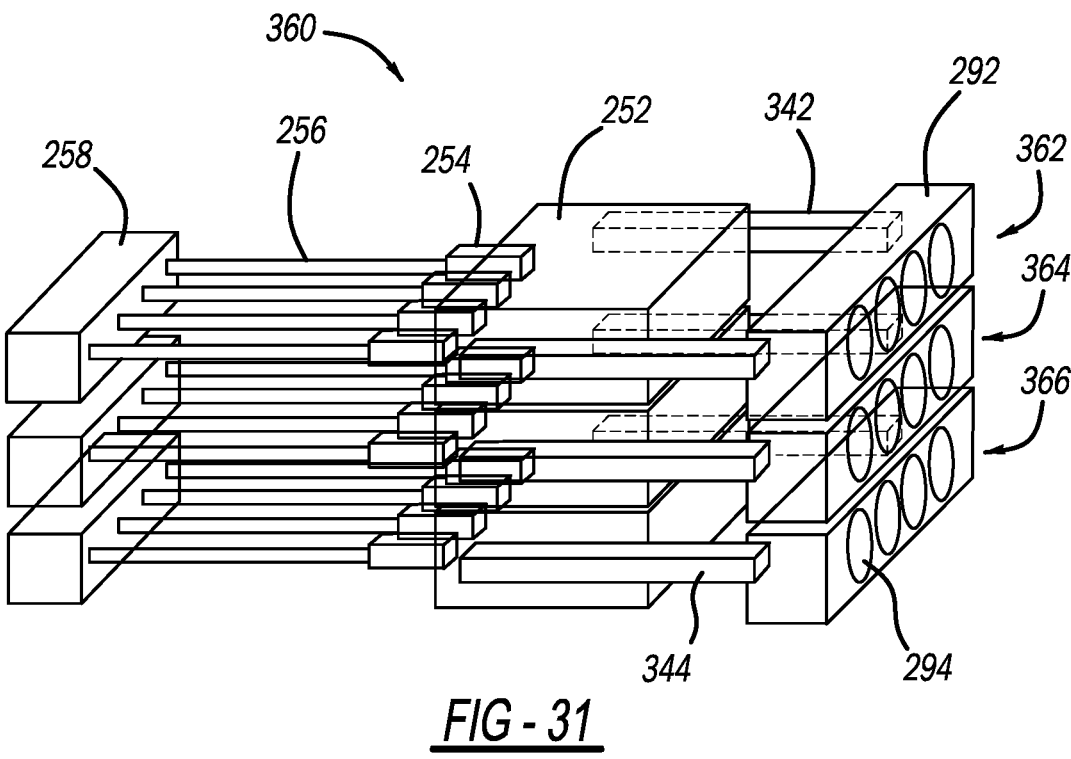
FIG. 31 is an illustration of a 2D optical assembly including a plurality of 1D optical assemblies and optical element.

Once a number of the 1D optical assemblies discussed above have been configured and aligned by any of the techniques discussed above, then two or more of the 1D optical assemblies can be stacked on each other to form a 2D optical assembly. FIG. 31 is an illustration of a stacked 2D 362, a second row 1D optical assembly 364 stacked on the optical assembly 362 and a third row 1D optical assembly 366 stacked on the optical assembly 364, as shown, where like elements to the assembly 340 are identified by the same reference number. A suitable precision translation table (not shown) can be employed to align the optical assemblies 362, 364 and 366 as they are being assembled, and they can be secured together at the proper location by any suitable technique. A corrector lens assembly (not shown), such as the trim beam shaper arrays 62 and 66, can then be employed to provide further beam alignment correction.

Figure 32:
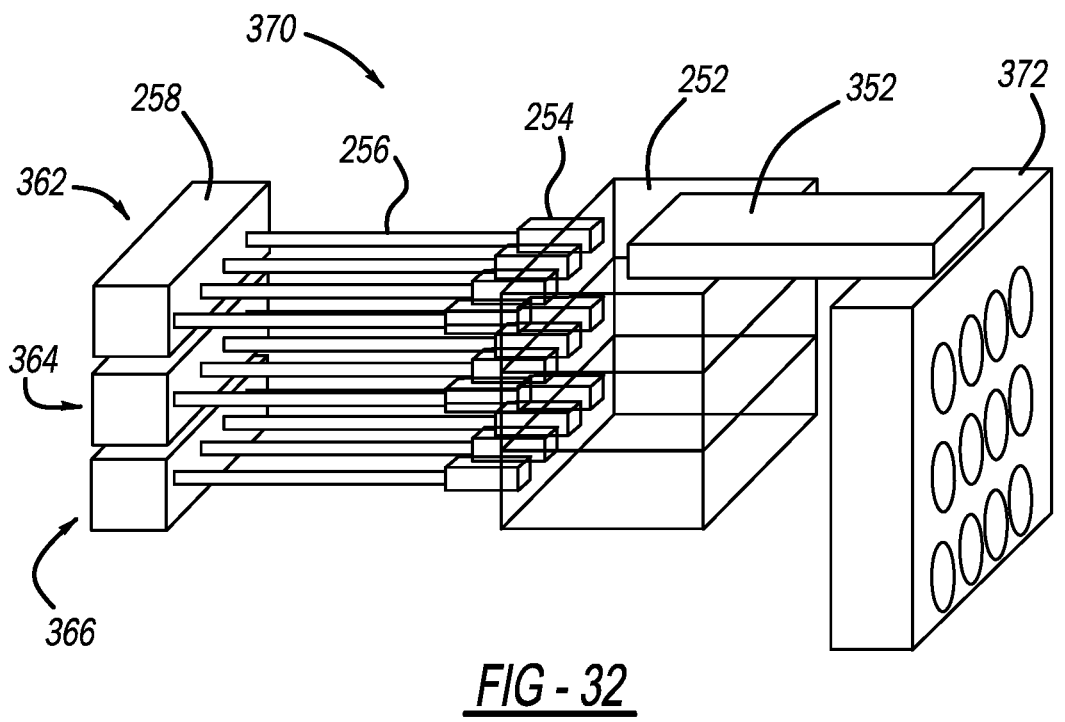
FIG. 32 is an illustration of a 2D optical assembly including a plurality of 1D optical assemblies and a single optical element.

Alternately, the fibers 256 can be aligned to the endcaps 252 in each of the 1D optical assemblies that will be part of a 2D optical assembly, then stacked together, and then a single piece 2D optical element can be aligned to the stack. FIG. 32 illustrates an optical assembly 370 that includes the optical assemblies 362, 364 and 366 stacked and aligned with each other and then aligned with a single 2D element 372, where like elements to the assembly 360 are identified by the same reference number.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A system for fabricating an optical element, said system comprising:
  means for welding an array of fibers to the optical element;
  means for measuring an angle error and a position error of each fiber relative to the element;
  means for calculating a correction for each fiber for the angle error and the position error; and
  means for correcting the angle and position of each fiber using the calculated corrections.

2. The system according to claim 1 wherein the means for measuring the angle and position errors of each fiber provides an optical beam propagating down the fiber, defines an image point where a tip of each fiber contacts the optical element, and images each optical beam at the image point in a far-field plane and a near-field plane.

3. The system according to claim 2 wherein the means for measuring the angle and position errors of each fiber uses a telescope to image the image point in the far-field and uses a microscope to image the image point in the near-field.

4. The system according to claim 2 wherein the means for measuring the angle and position errors of each fiber uses an interferometer for imaging each optical beam.

5. The system according to claim 2 wherein the means for correcting the angle of each fiber applies a force to the fiber in a direction determined by the calculated corrections to bend the fiber, heats a weld joint between the fiber and the optical element, allows the fiber and the optical element to cool, and then removes the force so that the fiber remains bent.

6. The system according to claim 5 wherein the means for correcting the angle of each fiber applies the force with a sapphire rod.

7. The system according to claim 1 wherein the means for correcting the angle and position of each fiber provides a trim beam shaper array adjacent to the optical element.

8. The system according to claim 1 wherein the optical element is a 1D beam shaper array.

9. The system according to claim 1 wherein the optical element is a 2D beam shaper array.

10. A system for fabricating an optical element, said system comprising:

means for welding an array of fibers to the optical element;

means for measuring an angle error and a position error of each fiber relative to the element;

means for calculating a correction for each fiber for the angle error and the position error; and means for correcting the angle and position of each fiber using the calculated corrections, wherein the optical element includes an input beam shaper array having a plurality of rectilinear input array cells positioned adjacent and in contact with each other in a tiled manner, each input array cell including an input beam shaper that receives one of a plurality of beams and is shaped to cause the beam to expand as it propagates away from the input beam shaper array to be converted from the round Gaussian profile to a high fill factor flat-top profile and cause the high fill factor flat-top profile to taper to a lower value at a perimeter of each beam, and an output beam shaper array including a plurality of rectilinear output array cells positioned adjacent and in contact with each other in a tiled manner so that each output array cell is matched to an input array cell, each output array cell including an output beam shaper that receives one of the converted beams and is shaped to flatten the wavefront of the converted beam so that the output beam shaper array provides a plurality of adjacent beams with minimal overlap and a minimal gap between the beams.

11. The system according to claim 10 wherein the plurality of input array cells and the plurality of output array cells are all square cells.

* * * * *